United States Patent
Guo et al.

(10) Patent No.: US 12,349,202 B2
(45) Date of Patent: Jul. 1, 2025

(54) RANDOM ACCESS CHANNEL TRANSMISSION FOR FRAME BASED EQUIPMENT (FBE) MODE

(71) Applicant: QUALCOMM Incorporated, San Diego, CA (US)

(72) Inventors: Shaozhen Guo, Beijing (CN); Xiaoxia Zhang, San Diego, CA (US); Changlong Xu, Beijing (CN); Jing Sun, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/999,413

(22) PCT Filed: Jul. 31, 2020

(86) PCT No.: PCT/CN2020/106383
§ 371 (c)(1),
(2) Date: Nov. 21, 2022

(87) PCT Pub. No.: WO2022/021408
PCT Pub. Date: Feb. 3, 2022

(65) Prior Publication Data
US 2023/0199856 A1    Jun. 22, 2023

(51) Int. Cl.
*H04W 4/00* (2018.01)
*H04W 74/08* (2009.01)
*H04W 74/0833* (2024.01)
*H04W 72/0446* (2023.01)

(52) U.S. Cl.
CPC ... *H04W 74/0833* (2013.01); *H04W 74/0891* (2013.01); *H04W 72/0446* (2013.01)

(58) Field of Classification Search
None
See application file for complete search history.

(56) References Cited

U.S. PATENT DOCUMENTS

| | | |
|---|---|---|
| 2016/0309511 A1 | 10/2016 | Li et al. |
| 2019/0335456 A1* | 10/2019 | Yerramalli ........ H04W 74/0808 |
| 2020/0021423 A1 | 1/2020 | Liu et al. |
| 2020/0037354 A1 | 1/2020 | Li et al. |
| 2021/0084683 A1* | 3/2021 | Li ..................... H04W 74/0808 |

(Continued)

FOREIGN PATENT DOCUMENTS

| | | |
|---|---|---|
| CN | 107926042 A | 4/2018 |
| CN | 109688626 A | 4/2019 |

OTHER PUBLICATIONS

International Search Report and Written Opinion—PCT/CN2020/106383—ISA/EPO—Apr. 16, 2021.

*Primary Examiner* — Bob A Phunkulh
(74) *Attorney, Agent, or Firm* — Haynes and Boone, LLP

(57) ABSTRACT

A method of wireless communication performed by a user equipment (UE), the method comprising: receiving, from a base station (BS), a random access configuration for a plurality of frame based equipment (FBE) frames, each FBE frame of the plurality of FBE frames including a transmission period and an idle period; and determining a plurality of ROs based on the random access configuration, wherein at least one RO of the plurality of ROs is at least partially overlapping with the idle period of at least one FBE frame of the plurality of FBE frames.

35 Claims, 28 Drawing Sheets

(56) References Cited

U.S. PATENT DOCUMENTS

2021/0297969 A1\* 9/2021 Myung ............. H04W 74/0816
2021/0385863 A1\* 12/2021 Fan .................. H04W 74/0841
2022/0386371 A1\* 12/2022 Jiang ..................... H04W 16/14

\* cited by examiner

| PRACH Configuration Index | Preamble format | $n_{SFN} \mod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | - | - | 0 |
| 1 | 0 | 8 | 1 | 9 | 0 | - | - | 0 |
| ... | | | | | | | | |
| 71 | A1 | 2 | 1 | 4,9 | 7 | 1 | 3 | 2 |
| ... | | | | | | | | |

FIG. 4A

| RACH configuration period (ms) | Mapping period set (# of RACH configuration period) |
|---|---|
| 10 | {1, 2, 4, 8, 16} |
| 20 | {1, 2, 4, 8} |
| 40 | {1, 2, 4} |
| 80 | {1, 2} |
| 160 | {1} |

FIG. 6A

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$ PRACH duration |
|---|---|---|---|---|---|---|---|---|
| | | x | y | | | | | |
| 0 | 0 | 16 | 1 | 9 | 0 | - | - | 0 |
| 1 | 0 | 8 | 1 | 9 | 0 | - | - | 0 |
| ... | | | | | | | | |
| 75 | A1 | 2 | 1 | 4,9 | 0 | 2 | 6 | 2 |
| 81 | A1 | 1 | 0 | 4,9 | 0 | 1 | 6 | 2 |
| ... | | | | | | | | |

800

810 Preamble format
812 $n_{SFN} \bmod x = y$
814 Subframe number
816 Starting symbol
818 Number of PRACH slots within a subframe
820 $N_t^{RA,slot}$, number of time-domain PRACH occasions within a PRACH slot
822 $N_{dur}^{RA}$ PRACH duration
803
805

FIG. 8

| FFP(ms) | Idle period (OS) # =ceil {max(5% of FFP, 100us) / Ts} | | Subframe number X |
|---|---|---|---|
| | 15kHz | 30kHz | |
| 1 | 2 | 3 | 0,1,2,3,4,5,6,7,8,9 |
| 2 | 2 | 3 | 1,3,5,7,9 |
| 2.5 | 2 | 4 | 3,5,8,10 |
| 4 | 3 | 6 | 3,7 for even frame 1,4,9 for odd frame |
| 5 | 4 | 7 | 4,9 |
| 10 | 7 | 14 | 9 |

FIG. 10

OPTION 2B-1 15kHz PRACH SCS 10mms FFP

| PRACH preamble | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|
| A1 | 6 | 1 | 3 | 2 |
| A1 | 7 | 1 | 3 | 2 |
| A2 | 4 | 1 | 2 | 4 |
| A2 | 9 | 1 | 1 | 4 |
| A3 | 6 | 1 | 1 | 6 |
| A3 | 7 | 1 | 1 | 6 |
| B1 | 6 | 1 | 4 | 2 |
| B1 | 8 | 1 | 3 | 2 |
| B4 | 6 | 1 | 1 | 6 |
| B4 | 2 | 1 | 2 | 6 |
| C0 | 8 | 1 | 3 | 2 |
| C0 | 6 | 1 | 4 | 2 |
| C2 | 2 | 1 | 2 | 8 |
| C2 | 8 | 1 | 1 | 2 |
| A1/B1 | 6 | 1 | 4 | 2 |
| A1/B1 | 8 | 1 | 3 | 2 |
| A2/B2 | 4 | 1 | 2 | 4 |
| A2/B2 | 6 | 1 | 2 | 4 |
| A3/B3 | 6 | 1 | 1 | 6 |
| A3/B3 | 2 | 1 | 2 | 6 |

OPTION 2B-1 30kHz PRACH SCS, 10ms FFP

| PRACH preamble | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|
| A1 | 0 | 1 | 6 | 2 |
| A1 | 7 | 1 | 3 | 2 |
| A2 | 0 | 1 | 3 | 4 |
| A2 | 9 | 1 | 1 | 4 |
| A3 | 0 | 1 | 2 | 6 |
| A3 | 7 | 1 | 1 | 6 |
| B1 | 2 | 1 | 6 | 2 |
| B1 | 8 | 1 | 3 | 2 |
| B4 | 0 | 1 | 2 | 6 |
| B4 | 2 | 1 | 2 | 6 |
| C0 | 2 | 1 | 6 | 2 |
| C0 | 8 | 1 | 3 | 2 |
| C2 | 2 | 1 | 2 | 6 |
| C2 | 8 | 1 | 1 | 6 |
| A1/B1 | 2 | 1 | 6 | 2 |
| A1/B1 | 8 | 1 | 3 | 2 |
| A2/B2 | 0 | 1 | 3 | 4 |
| A2/B2 | 6 | 1 | 2 | 4 |
| A3/B3 | 0 | 1 | 2 | 6 |
| A3/B3 | 2 | 1 | 2 | 6 |

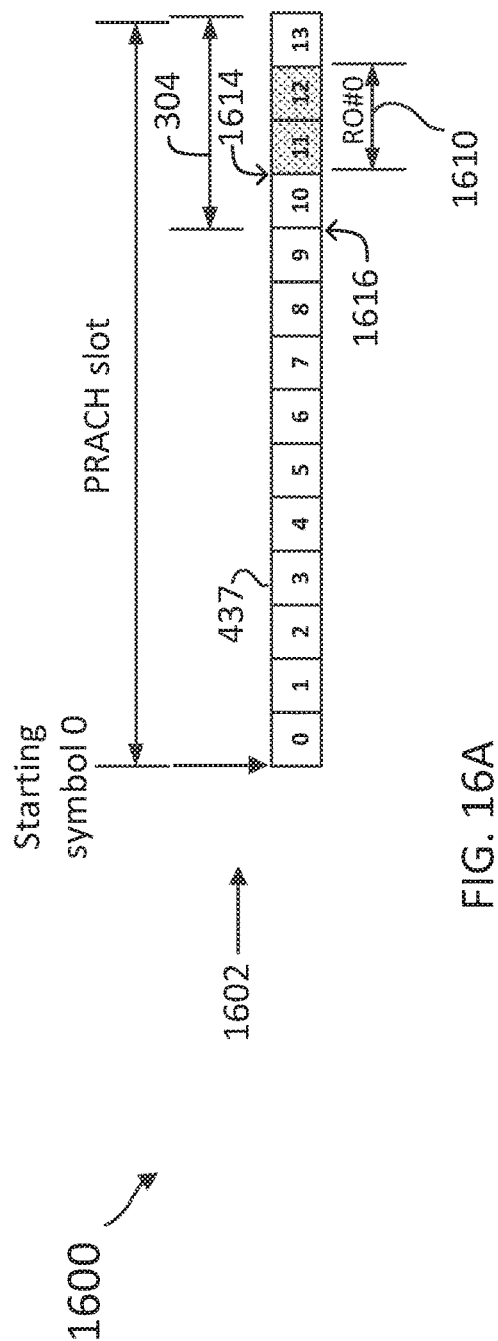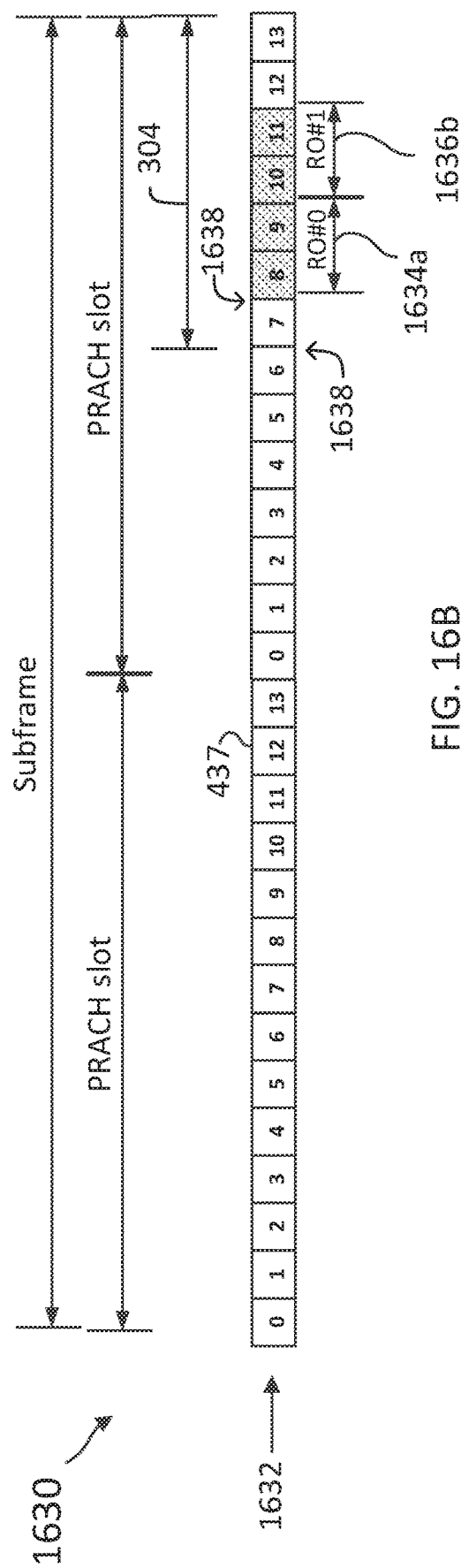

2000

Transmit, to a UE, a random access configuration for a plurality of FBE frames, each FBE frame including a transmission period and an idle period — 2010

Determine a plurality of random access occasions based on the random access configuration, wherein at least one random access occasion of the plurality of random access occasions at least partially overlaps with the idle period of an FBE frame — 2020

FIG. 20

RANDOM ACCESS CHANNEL TRANSMISSION FOR FRAME BASED EQUIPMENT (FBE) MODE

CROSS-REFERENCE TO RELATED APPLICATIONS

The present application is a 35 U.S.C. 371 National Phase entry of Patent Cooperation Treaty (PCT) Application No. PCT/CN2020/106383, filed Jul. 31, 2020, which is hereby expressly incorporated herein by reference in its entirety.

TECHNICAL FIELD

The present disclosure is directed to wireless communication systems and methods. Certain aspects can enable and provide techniques for random access preamble transmissions in idle periods of frame based equipment (FBE) frames.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a BS may schedule a UE for an UL transmission in an unlicensed frequency band. The UE may perform an LBT procedure prior to the scheduled time. When the LBT is a success, the UE may proceed to transmit UL data according to the schedule. When the LBT fails, the UE may refrain from transmitting.

There are two types of LBT procedures, a frame based equipment (FBE)-based LBT and a load based equipment (LBE)-based LBT. In FBE-based LBT, channel sensing is performed at predetermined time instants. For instance, if the channel is busy, a transmitting node may back off for a predetermined time period and sense the channel again after this period. In LBE-based LBT, channel sensing is performed at any time instant and random back-off is used if the channel is found busy.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first wireless communication device, the method includes communicating, with a second wireless communication device, a random access configuration for a plurality of frame based equipment (FBE) frames, each FBE frame of the plurality of FBE frames including a transmission period and an idle period; and determining a plurality of random access occasions based on the random access configuration, wherein at least one random access occasion of the plurality of random access occasions is at least partially overlapping with the idle period of at least one of the plurality of FBE frames.

In an additional aspect of the disclosure, a wireless communication device comprising a transceiver configured to communicate, with a second wireless communication device, a random access configuration for a plurality of frame based equipment (FBE) frames, each FBE frame of the plurality of FBE frames including a transmission period and an idle period; and a processor in communication with the transceiver, the processor configured to: determine a plurality of random access occasions based on the random access configuration, wherein at least one random access occasion of the plurality of random access occasions is at least partially overlapping with the idle period of at least one of the plurality of FBE frames.

In an additional aspect of the disclosure, a wireless communication device includes means for communicating, with a second wireless communication device, a random access configuration for a plurality of frame based equipment (FBE) frames, each FBE frame of the plurality of FBE frames including a transmission period and an idle period; and means for determining a plurality of random access occasions based on the random access configuration, wherein at least one random access occasion of the plurality of random access occasions is at least partially overlapping with the idle period of at least one of the plurality of FBE frames.

In an additional aspect of the disclosure, a non-transitory computer-readable medium having program code recorded thereon for wireless communication by a wireless communication device, the program code includes code for causing the wireless communication device to communicate, with a second wireless communication device, a random access configuration for a plurality of frame based equipment (FBE) frames, each FBE frame of the plurality of FBE frames including a transmission period and an idle period; and code for causing the wireless communication device to determine a plurality of random access occasions based on the random access configuration, wherein at least one random access occasion of the plurality of random access occasions is at least partially overlapping with the idle period of at least one of the plurality of FBE frames.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4A is a table illustrating physical random access channel (PRACH) resource configurations according to some aspects of the present disclosure.

FIG. 6A is a table illustrating an exemplary PRACH period association configuration according to some aspects of the present disclosure.

FIG. 8 is a table illustrating PRACH resource configurations according to some aspects of the present disclosure.

FIG. 10 is a table illustrating PRACH resource configurations according to some aspects of the present disclosure.

FIG. 12 is a table illustrating PRACH resource configurations according to some aspects of the present disclosure.

FIG. 13 is a table illustrating PRACH resource configurations according to some aspects of the present disclosure.

FIG. 16A illustrates a PRACH resource configuration according to some aspects of the present disclosure.

FIG. 16B illustrates a PRACH resource configuration according to some aspects of the present disclosure.

FIG. 20 is a flow diagram of a wireless communication method according to some aspects of the present disclosure.

DETAILED DESCRIPTION

Figure 1:
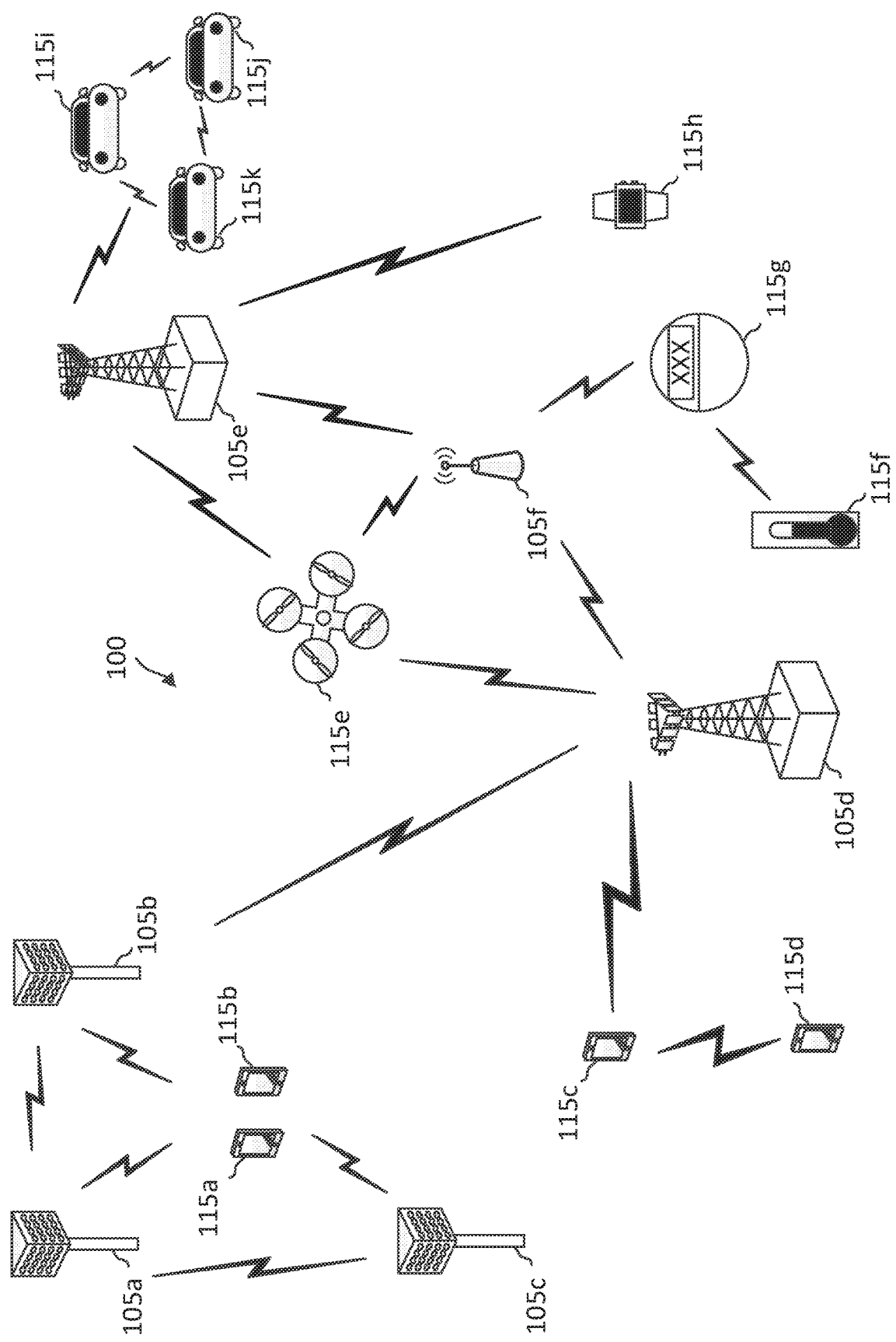
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgment in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a cellular wireless communication network, a UE may request a connection setup to the network, commonly referred to as random access. The random access plays three main roles, including: (i) establishment of a radio link and uplink synchronization for initial access (ii) to re-establish a radio link after radio-link failure (iii) for handover when uplink synchronization needs to be established to the new cell. The UE may initiate a random access procedure in an uplink Random Access Channel (RACH). The first step in the random access procedure is the transmission of a random access preamble. The main purpose of the preamble transmission is to notify the presence of a random access attempt to the BS and to allow the BS to estimate the delay between the BS and the UE. The delay estimate will be used to adjust the uplink timing.

The time frequency resources on which the random access preamble is transmitted is known as the Physical Random Access Channel (PRACH). The network broadcast information to all the UEs which time-frequency resources (PRACH resources) are allowed for the preamble transmission on Downlink Physical Broadcast Channel (DL-PBCH). For instance, the PRACH information may be informed to the UEs via System Information Block (SIB) 2.

In some aspects, a wireless communication network can operate over an unlicensed band. The deployment of NR over an unlicensed spectrum is referred to as NR-unlicensed (NR-U). Channel access in unlicensed bands, such as 5 GHz and 6 GHz bands, may be regulated by authorities, such as Federal Communications Commission (FCC). For example, FCC imposes various regulations on the maximum equivalent isotropically radiated power (EIRP) and the maximum EIRP power spectral density (PSD) that a transmitting node may transmit in a 6 GHz band. EIRP may refer to the amount of power a radio transmitter system (including transmitter and radiating antenna) may emit. EIRP PSD may refer to the amount of power per bandwidth unit a radio transmitter system may emit.

One issue of cellular network operating in unlicensed spectrum is to ensure a fair coexistence with other unlicensed system (e.g., Wi-Fi). Fairness for NR-U device is defined as the ability that the NR-U device does not impact the other devices operating in the same band. For example, the regulation mandates the use of Listen-Before-Talk (LBT) protocols. LBT is a spectrum sharing mechanism by which a device senses the spectrum band using a Clear Channel Assessment (CSA) check before accessing to it.

An NR-U UE or BS may first sense the communications channel to find out there is no communication prior to any transmission. In some aspects, the channel sensing procedure relies on detecting energy level on multiple sub-bands of the of the frequency band. The LBT parameters (e.g., duration, CSA parameters, etc.) are configured in the UE by the BS.

There are two types of LBT procedures, a frame based equipment (FBE)-based LBT and a load based equipment (LBE)-based LBT. In FBE-based LBT, channel sensing is performed at predetermined time instants. For instance, if the channel is busy, a transmitting node may back off for a predetermined time period and sense the channel again after this period. In LBE-based LBT, channel sensing is performed at any time instant and random back-off is used if the channel is found busy. For instance, in the FBE mode, the NR-U unlicensed devices (e.g., UE, BS) are allowed to contend for the channel beginning only at synchronized frame boundaries. The FBE NR-U device has to detect the energy level at a designated time equal to CCA period. If the energy level in the channel is below the CCA threshold, then the equipment can transmit for a fixed frame period equal to Channel Occupancy Time (CoT).

In some aspects, a BS may broadcasts system information in a network to facilitate UEs in accessing the network. The system information may be in the form of a set of Synchronization Signal Blocks (SSBs) and/or RMSI (Remaining Minimum System Information). In some instances, the BS may broadcast RMSI indicating an FBE transmission configuration via a downlink BCH. The FBE transmission configuration may also be referred to as a Fixed Frame Period (FFP) configuration. In some instances, the RMSI may include a system information block 1 (SIB-1) carrying the FFP configuration. In some other instances, the BS may signal the FFP configuration for a UE with UE specific RRC signaling, for example, for an FBE Secondary Cell (sCell).

In some aspects, there is a fixed association between the set of SSBs and the PRACH resources broadcast by the system information. For instance, each of the set of SSBs may be identified by an SSB index and may be mapped or associated with the PRACH resources in a sequential order. The PRACH resources may also be referred to as random access channel (RACH) occasions, or random access occasions (ROs). The fixed association can be useful when the BS transmits different SSBs in the set of SSBs in different beam directions, for example, when operating in frequency range 1 (FR1) and/or in frequency range 2 (FR2). For instance, the BS may monitor for a random access preamble in a RO in a same beam direction as where an SSB associated with the RO is transmitted. Thus, a UE detecting a certain SSB in a certain beam direction may transmit a random access preamble in an RO associated with the SSB using a beam directing to the same direction as where the SSB is received.

The present disclosure describes mechanisms for configuring PRACH transmission resources for UEs operating in an FBE transmission mode. In an FBE mode, a frequency band may be time-partitioned into a plurality of FFPs. Each FFP may include a transmission period and an idle period. The idle periods may be used for channel sensing (e.g., performing LBT). The transmission may be used for transmission upon a successful contention in a corresponding idle period. In 3GPP Release 16 FBE operations, if a RO overlaps with an idle period of an FFP, the UE considers the PRACH resource as an invalid resource. The FFP may also be referred to as FBE frames. Hence, in these scenarios, the Synchronization Signal Blocks (SSBs) cannot be mapped to the ROs. Therefore, in order to improve throughput and connectivity in an NR-U system, the present disclosure provides techniques to utilize a ROs in FFPs including the ROs that are partially overlapping and/or within idle periods of the FFPs. For instance, the UE may map SSBs to ROs in the idle period of a FFP. It will be appreciated that although the mechanisms described in this disclosure are in the context of NR, similar mechanisms can be applied to any suitable wireless communication protocols operating in an FBE mode.

In some aspects, a mechanism for mapping SSB-to-RO is described. This mechanism includes two rounds of SSB-to-RO mapping that can be performed at a BS and/or at a UE. For instance, the BS performs a grouping procedure to divide ROs in a plurality of FFPs into two groups. The grouping may be based on whether an RO overlaps or at least partially overlaps with an idle period of an FFP. For example, a first group includes ROs that are outside of the idle periods of the FFPs, and the second group includes ROs that are at least overlapping with the idle period of the FFPs. In other words, ROs that are outside of the idle periods, partially overlapping with the idle periods, and/or fully within the idle periods are considered as valid ROs. Similarly, the UE performs a two rounds procedure to map SSB-to-RO to divide ROs into a first group including ROs outside of idle periods of the FFPs, and a second group including ROs at least partially overlapping with idle periods of the FFPs. For each group, the SSBs are mapped to the corresponding valid ROs in the same order as described in 3GPP Release 16 specifications.

In some aspects, mapping the set of SSBs to the ROs in the first group and the ROs in the second group is performed based on a common association period. The association period is the period to complete the association of the set of SSBs. For instance, the BS may transmit each SSB in the set of SSBs at least once (e.g., in a sequential order) within the association period. In some instances, the association period of the first group is used as a common association period for the association of the set of SSBs in both groups. In some other instances, the UE and/or the UE determine the maximum association period between the association periods of the first and second group, and use it as the association period for the completion of the association of the set of SSBs to the ROs. In some other aspects, the BS and/or the UE determine a first association period to complete the association of the set of SSBs first group, and a second association period to complete the association of the set of SSBs in the second group.

In some other aspects, a BS may configure a UE with two PRACH configurations, for example, via Radio Resource Control (RRC) signaling. The first PRACH configuration is similar to the legacy PRACH defined in 3GPP Release 16, where ROs that are outside of idle periods of FFPs are valid. For the second PRACH configuration, ROs that are at least partially overlapping with idle periods of FFPs are valid.

In yet other aspects, a BS nay configure two PRACH configurations, where a first PRACH configuration may be similar to the legacy PRACH defined in 3GPP Release 16 (where ROs that are outside of idle periods of FFPs are valid) and a second PRACH configuration configured based on idle periods in FFPs. The second PRACH configuration may indicate a starting symbol and/or a number ROs in a PRACH slot or random access slot. In some instances, the starting symbol and the number of ROs in a PRACH slot are configured such that the ROs are placed within the idle period or partially overlapped with the idle period. In some other instances, the starting symbol is configured such that the starting symbol of an earliest RO in the PRACH slot is fully within an idle period of an FFP and offset from a beginning symbol of the idle period, and the number of ROs is configured such that all ROs in the PRACH slot are placed within the PRACH slot.

Aspects of the present disclosure can provide several benefits. For example, allowing PRACH resources or ROs to be partially overlapping and/or fully overlapping with idle periods for FFPs or FBE frames can significantly increase the number of valid or available ROs (opportunities for random access), increasing the probability of a UE in successfully completing the random access procedure, thereby improving network connectivity and data rates. The increased random access opportunities can also benefit ultra-reliable low-latency communication (URLLC) Industrial Internet of Thing (IIoT) devices with strict requirements on latency and reliability, for example, allowing UEs to initiate a COT in idle period for a 2-step random access procedure or a 4-step random access procedure. Additionally, configuring UE with two RACH configurations, as described herein, enables both the legacy 3GPP Release 16 UEs and UEs (that are allowed to utilize ROs in idle periods of FFPs) as discussed in the present disclosure to establish a connection to an NR-U network.

As used herein, the terms "random access occasions" and "PRACH resources" may be used interchangeably. As described herein, the terms "random access configuration" and "PRACH configuration" and "PRACH resource configuration" may be used interchangeably. As described herein, the terms "FBE frames" and "FFPs" may be used interchangeably.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots as will be discussed more fully below in relation to FIG. 2. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over an unlicensed band, for example, a 6 GHz bands. As discussed above, FCC may regulate maximum EIRP and/or maximum EIRP PSD for transmission in a 6 GHz band. Thus, when the network operates over a 6 GHz channel, a BS 105 may communicate with a UE 115 in accordance with the FCC regulation. The BS 105 may broadcast system information indicating a FBE configuration and a PRACH configuration to facilitate UEs 115 in accessing the network 100 over the unlicensed band. The FBE configuration may include information associated with durations for FFPs, durations and/or locations of idle periods in the FFPs. The PRACH configuration may indicate PRACH resources or ROs where a UE 115 may use to transmit a PRACH preamble to initiate a network access. In some aspects, the BSs 105 and/or the UEs 115 may be 3GPP Rel. 16 NR-U compliant BSs and/or UEs, respectively, which may communicate with each other in the FBE. The 3GPP Rel. 16 NR-U compliant BS and/or UE may consider PRACH resources or ROs outside of the idle period of a transmitted FBE frame as valid and may consider ROs that are fully overlapping or partially overlapping with idle periods of FBE frames or FFPs as invalid. According to aspects of the present disclosure, the BSs 105 and/or the UEs 115 may operate in an FBE mode and may utilize ROs that are outside of idle periods of FFPs, partially overlapping with idle periods of the FFPs, and/or fully within idle periods of FFPs valid, and thus may have a greater number of opportunities for performing random access.

In some aspects, the BS 105 may transmit a PRACH configuration to the UE 115. The PRACH configuration may indicate a set of ROs in the PRACH configuration. The BS 105 and/or the UE 115 may divide ROs into two different groups, a first group where the ROs are placed within the idle periods of the FFPs, and a second group where the PROs are partially overlapped with the idle periods of the FFPs. In some other aspects, the BS 105 may transmit two PRACH configurations to the UE 105, a first PRACH configuration and a second PRACH configuration. The first PRACH configuration may be similar to a 3GPP Release 16 PRACH configuration where ROs that are outside of idle periods of FFPs are valid. The second PRACH configuration where ROs that are at least partially overlapping with idle periods of FFPs are valid as defined according to the present disclosure.

In some aspects, the UE 115 is a legacy NR-U Release 16 UE. The legacy Release 16 UE may monitor for system information from the BS 105 and may receive one or more PRACH configurations from the BS 105. The legacy Release 16 UE may establish communication with the BS using via only ROs that are outside of idle periods of FFPs. In another aspects, the UE 115 is an enhanced UE. The enhanced UE may establish communication with the BS 105 using ROs that are outside of idle periods, within idle periods, and/or partially overlapped with the idle period of the FFPs.

In some aspects, the BS 105 may transmit two PRACH configurations, where a first PRACH configuration may be a 3GPP Release 16 PRACH configuration and a second PRACH configuration may be specifically configured for utilizing idle periods of FFPs. A legacy Release 16 UE may utilize the first PRACH configuration (with valid ROs outside of idle periods of FFPs) to establish a connection with the BS 105. An enhance UE may utilize both the first and second PRACH configurations to establish a connection with the BS 105. Mechanisms for configuring PRACH resources and utilizing ROs in idle periods of FFPs when operating in FBE mode of operations are described in greater detail herein.

Figure 2:
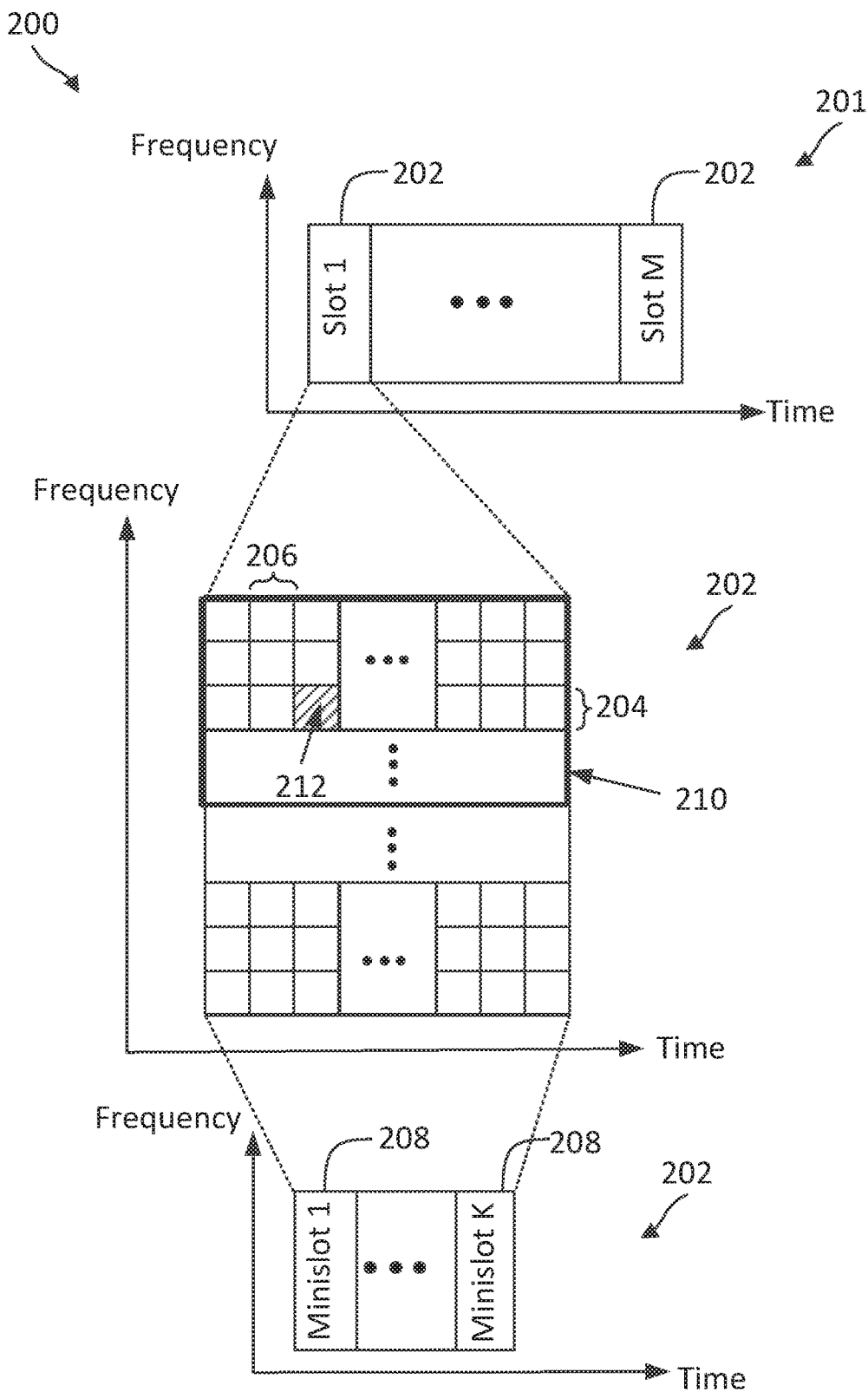
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and one or more consecutive symbols 206 in time. In NR, a RB 210 is defined as twelve consecutive subcarriers 204 in a frequency domain.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
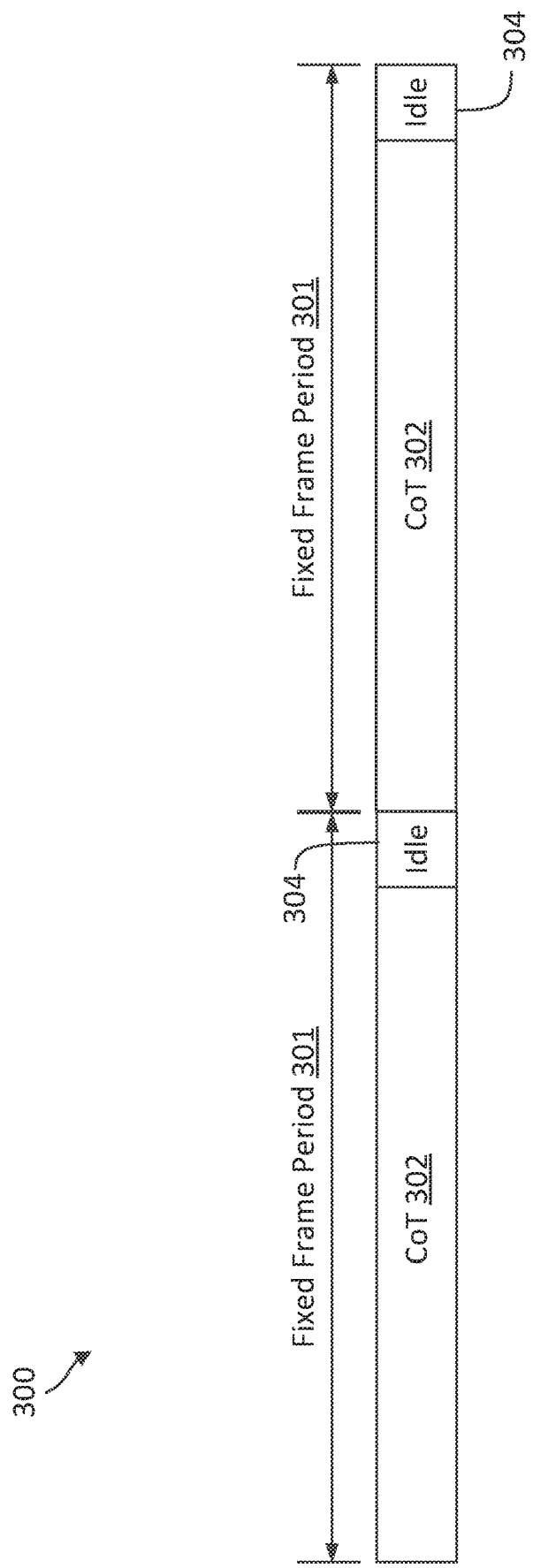
FIG. 3 illustrates a frame based equipment (FBE) frame structure according to some aspects of the present disclosure.

FIG. 3 illustrates an FBE frame structure 300 according to some aspects of the present disclosure. The structure 300 may be employed by BSs such as the BSs 105 and UEs such as the UEs 115 in a network such as the network 100 for communications. In particular, the BS may communicate with the UE in an FBE mode, for example, over a shared radio frequency band in an unlicensed spectrum or shared spectrum, using the structure 300. In FIG. 3, the x-axis represents time in some arbitrary units. The structure 300 may be employed in conjunction with the structure 200.

As shown, the frame structure 300 includes a plurality of FFPs 301 (e.g., in a shared radio frequency band). Each FFP 301 includes a Channel Occupancy Time (CoT) 302 and an idle period 304. The CoT 302 may also be referred to as a transmission period. A BS 105 or a UE 115 may perform channel sensing or an LBT in the idle period 304 and may access the frequency during a COT 302 in a subsequent FFP 301. Although FIG. 3 illustrates the idle period 304 located at the end of the FFP 301, it should be understood that in other examples the idle period of an FFP can located at the beginning of the FFP. In some aspects, some regulations may restrict the CoT 302 to be no longer than 95% of the frame length (the duration of the FFP 301) and the idle period to be no shorter than 5% of the frame length. In some aspects, some regulations may restrict the idle period to be no longer than 100 microseconds (µs).

In some aspects, the BS 105 and/or the UE 115 may perform an LBT in an idle period 304 to gain access to CoT 302 in a subsequent FFP 301. After gaining access to the CoT 302, the BS 105 and/or the UE 115 may communicate multiple UL and/or DL communications in the CoT 302 without another LBT. In some aspects, each FFP 301 is restricted to a duration of about 1 ms, 2 ms, 2.5 ms, 4 ms, 5 ms, or 10 ms. The starting positions of the FFPs 301 within every two radio frames (e.g., the radio frames 201) may start from an even radio frame and are given by $$i*P; i=\{0,1,\ldots,20/P-1\} \quad (1)$$

where P is a duration of an FFP 301.

In some aspects, the base station 105 notifies an FBE mode with the structure 300 to the UE 115 in an RMSI filed indicated in a broadcast channel (BCH) payload. The FFP configuration may be included in System Information Block (SIB) Type 1. SIB1 may include information relevant for a UE to evaluate whether the UE is allowed to access a corresponding cell. Also, SIB1 may provide the UE 115 with the scheduling of other system information.

The frame structure 300 broadcasted by the BS 105 may be used to perform channel access by the UE 115 at fixed time instants (CoT 302). The UE 115 may perform CCA to sense if the channel is available. If the channel is busy, the UE 115 may back off for a fixed period 302 and senses the channel again after the fixed period 302. In some instances, the UE 115 may measure the energy level during CoT 302, and if the energy level is lower than a threshold and if the UE 115 detected the channel is idle, the UE 115 may start transmitting data immediately in the CoT 302.

The UE 115 may transmit random access preambles on the Uplink Random Access Channel UL RACH to the BS 105 to establish a connection with the BS 105. As discussed above, the BS 105 may transmit a PRACH configuration indicating ROs where the UE 115 may use for random access preamble transmission. Depending on the PRACH configurations, some ROs may be fully within the CoTs 302 of the FFPs 301, and some other ROs may be at least partially overlapping with the idle periods 304 of the FFPs 301. In some as used cases, the UE 115 may transmit random access preambles only in ROs that are fully within a CoT 302 of an FFP 301. In some other instances the UE 115, may transmit random access preambles that are partially overlapped with the idle period 304 or fully within the idle period 304.

Figure 4B:
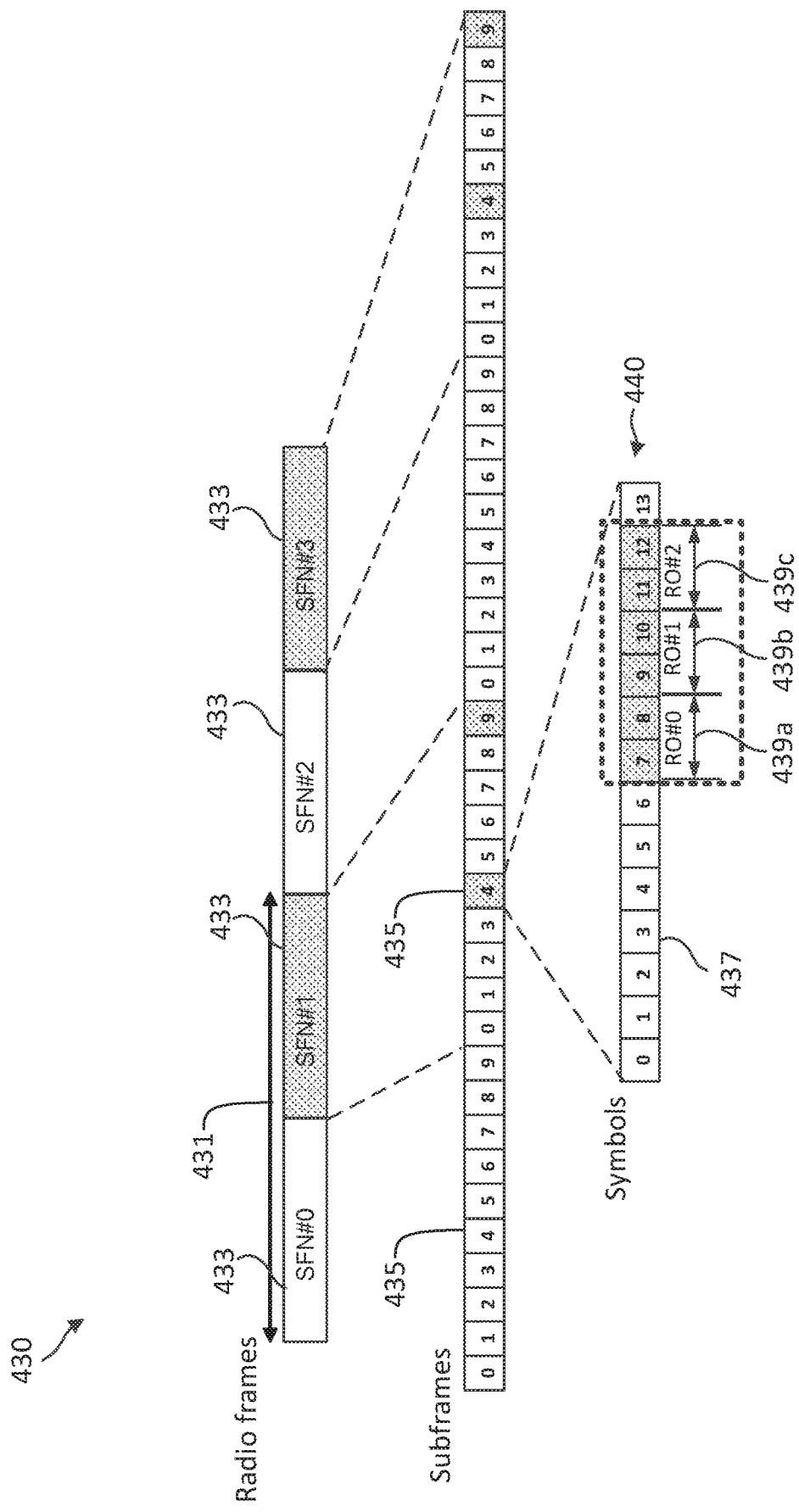
FIG. 4B illustrates a PRACH resource configuration according to some aspects of the present disclosure.

FIG. 4A is a table 400 illustrating PRACH resource configurations according to some aspects of the present disclosure. The PRACH resource configurations are time-domain PRACH configurations. As shown, the PRACH pattern shown in FIG. 4A is indexed by the PRACH configuration index. Each index references a PRACH configuration indicating PRACH resources or ROs for random access preamble transmissions. The PRACH Config Index specifies the index, which informs the UE 115 of a frame number (e.g., a System Frame Number (SFN) of a radio frame 201), a subframe number, a starting symbol, a number of PRACH slots within a subframe, number of time-domain ROs within a PRACH slot, a PRACH duration and preamble format within the frame has PRACH resource. For instance, as shown in FIG. 4A, configuration Index 71 defines a PRACH resource pattern 404. The column 410 indicates a preamble format to be used for generating a preamble sequence for a random access transmission. The column 412 indicates a starting SFN number (denoted by y) where ROs are located and a PRACH configuration period (denoted by x). The column 414 indicates subframes within a radio frame where ROs are located. The column 416 indicates a starting symbol number within a PRACH slot where ROs are located. The column 418 indicates a number of PRACH slots within a subframe. The column 420 indicates a number of ROs within a PRACH slot. The column 422 indicates the duration of each RO. Accordingly, the PRACH resource pattern 404 includes 3 ROs (each with a duration of 2 symbols starting at symbol 7) in one PRACH slot within subframe #4 and 3 ROs (each with a duration of 2 symbols starting at symbol 7) in one PRACH slot within subframe #9 of a radio frame with SFN #1 and repeated every 2 radio frames. In some aspects, each radio frame has a duration of 10 ms, and thus the PRACH resource pattern 404 repeats every 20 ms. An example of the PRACH resource pattern 404 in time is shown in FIG. 4B.

FIG. 4B illustrates a PRACH resource configuration 430 according to some aspects of the present disclosure. The configuration 430 illustrates the PRACH resource pattern 404 in time. As shown, each radio frame 433 includes 10 subframes 435, and each subframe 435 includes 14 OFDM symbols 437. The radio frames 433 are indexed sequentially, for example, as SFN #0, SFN #1, SFN #2, and SFN #3. The symbols 437 are indexed sequentially from 0 to 13. In some aspects, the BS 105 and the UE 115 may maintain synchronization based on the subframe number and the SFN number while in communication.

According to the PRACH configuration index 71 in FIG. 4A, the PRACH resource pattern 404 includes ROs in subframes 4 and 9 (shown by the patterned filled boxes) of radio frames 433 with SFN #1 and SFN #3 (as shown by the patterned filled boxes). An expanded view of subframe #4 of SFN #1 is shown by the reference numeral 440 where subframe #4 includes three ROs 439 (shown as 439a, 439b, and 439c) each with a duration of 2 symbols beginning at symbol number #7 according to the to the PRACH configuration index 71 in FIG. 4A. According to the PRACH configuration index 71 in FIG. 4A, the PRACH configuration period 431 is 20 ms. In some other PRACH configuration, the PRACH configuration period (periodicity) can be 10 ms, 20 ms, 40 ms, 80 ms, or 160 ms.

In some aspects, prior to initiation of a random access procedure, the UE 115 may receive, from a BS 105, a PRACH configuration index and may determine locations of ROs 439 in time as discussed above in relation to FIGS. 4A and 4B. Additionally, the UE 115 may receive an FBE configuration indicating a plurality of FBE frames (e.g., the FFPs 301) as discussed above in relation to FIG. 3. According to aspects of the present disclosure, the BS 105 and the UE 115 may group ROs that outside of idle periods of FFPs into a first group and ROs that are at least partially overlapping with idle periods of FFPs into a second group. The BS 105 and the UE 115 may perform an SSB-to-RO mapping procedure separately for the first group and the second group. The BS 105 may monitor for a random access preamble from the UE 115 according to the SSB-to-RO mapping. The UE 115 may select an RO based on the SSB-to-RO mapping to for transmitting a random access preamble. Mechanisms for performing SSB-to-RO mapping are described in greater herein below.

Figure 5A:
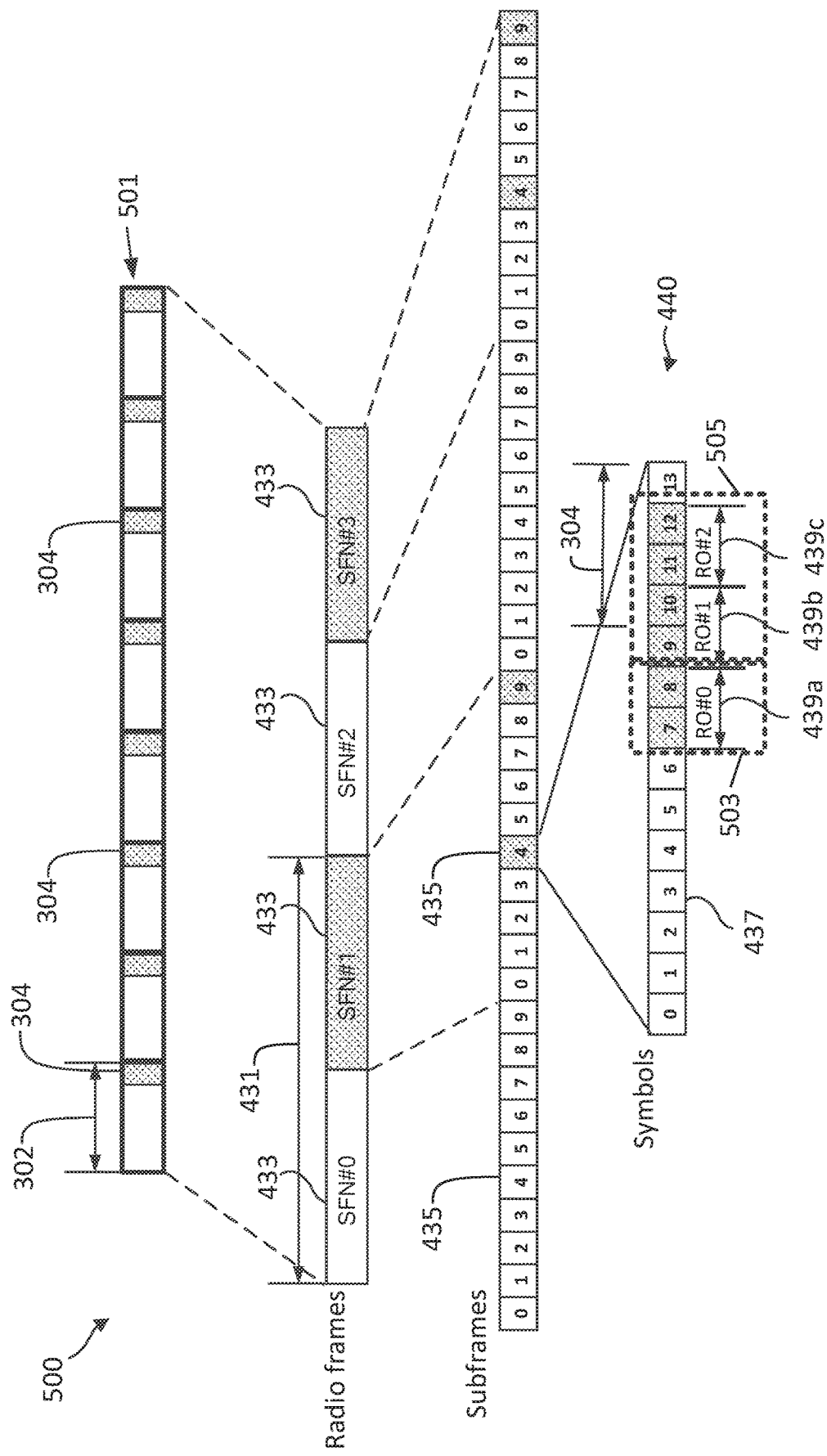
FIG. 5A illustrates a PRACH resource configuration according to some aspects of the present disclosure.
Figure 5B:
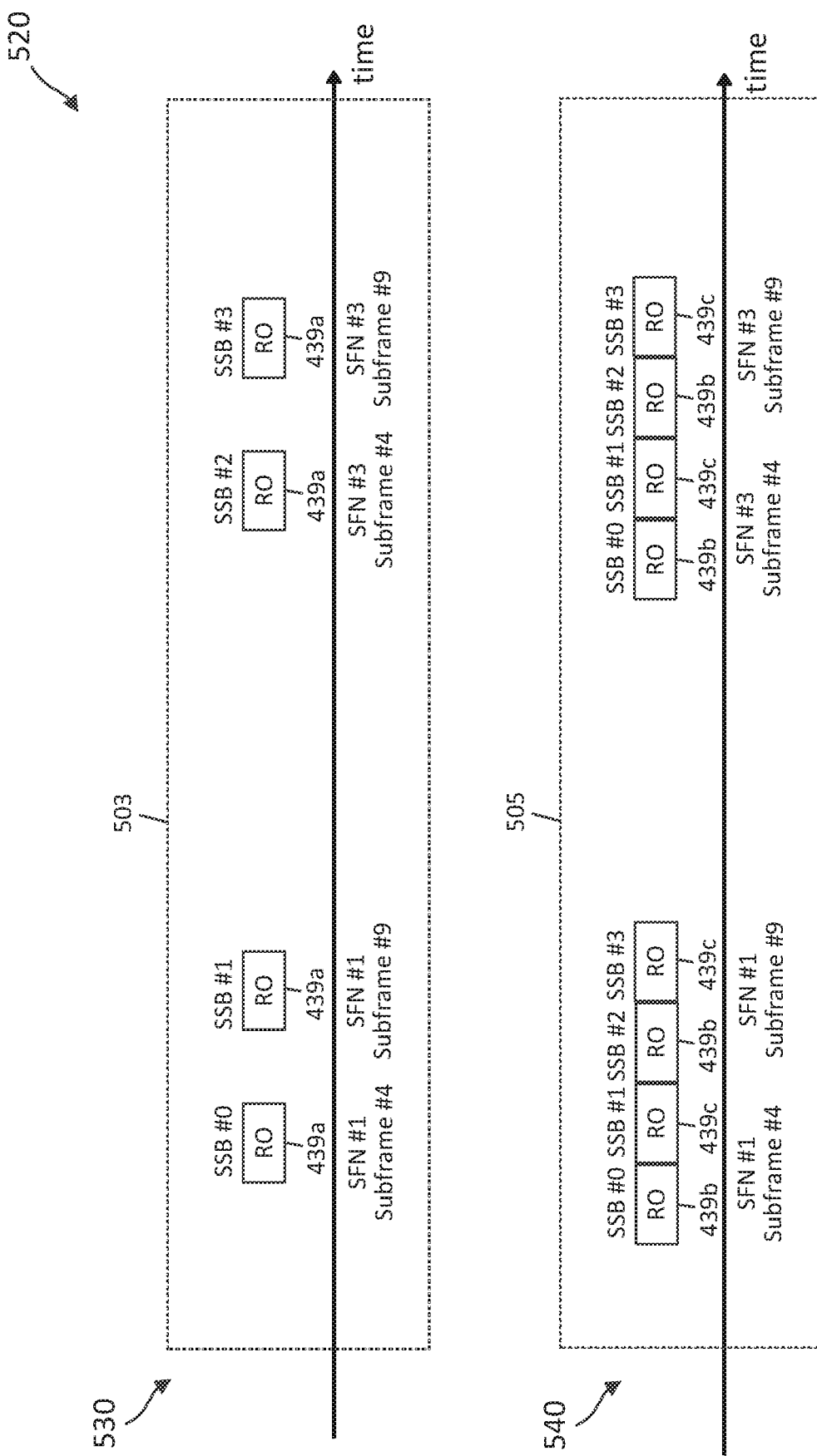
FIG. 5B illustrates a synchronization signal block-to-random access occasion (SSB-to-RO) mapping configuration according to some aspects of the present disclosure.

FIG. 5A is discussed in relation to FIG. 5B to illustrate an SSB-to-RO mapping. FIG. 5A illustrates a PRACH resource configuration 500 according to some aspects of the present disclosure. In particular, the configuration 500 illustrates RO grouping for SSB-to-RO mapping. The configuration 500 may be employed by BSs such as the BSs 105 and UEs such as the UEs 115 in a network such as the network 100 for communications. The configuration 500 is described using the same FBE structure as in FIG. 3 and the same PRACH configuration (e.g., PRACH resource pattern 404) as in FIG. 4, and may use the same reference numerals as in FIGS. 3 and 4 for simplicity's sake.

FIG. 5A illustrates an exemplary FBE configuration 501 with FFPs 301, each having a duration of 5 ms. When the subcarrier spacing is 15 kHz, each FFP 301 may include an idle period 304 corresponding to about 4 symbols, for example, based on a 5% idle period restriction for FBE-based channel access. With the 5 ms FFPs 301 and 4 symbols idle periods 304, the subframe 4 of SFN 1 in the PRACH resource pattern 440 may include an idle period 304 in the last 4 symbols (symbols index 10 to 13) of the subframe 4.

In the exemplary configuration 500, the BS 105 and/or the UE 115 may divide the ROs 439 allocated in subframe 4 of SFN, into two groups 503, 505 based on whether the ROs 439 overlaps with idle period 304 or not. Based on the grouping, the first group 503 includes the ROs 439 (e.g., the RO 439a) outside of the idle period 304, and the second group 505 includes the ROs (e.g. the ROs 439b and 439c) that are partially or fully overlapping with the idle period 304. While not shown in FIG. 5A, the subframe 9 of SFN 1 and the subframes 4 and 9 of SFN 3 may have ROs 439 in the same symbol locations as shown for the subframe 4 of SFN 1.

After grouping the ROs 439, the BS 105 and/or the UE 115 may perform SSO-to-RB mapping. As discussed above, the BS 105 may broadcast a set of SSBs (e.g., by sweeping through a set of beam directions) and each SSB in the set of SSBs may be identified by an SSB index and mapped or associated with ROs in a sequential order. As an example, the set of SSBs may include four SSBs indexed from 0 to 3 (shown as SSB #0, SSB #1, SSB #2, and SSB #3 in FIG. 5B). The BS 105 and/or the UE 115 may map the set of SSBs to the ROs 439 as shown below in FIG. 5B.

FIG. 5B illustrates an SSB-to-RO mapping configuration 520 according to some aspects of the present disclosure. The SSB-to-RO mapping configuration 520 is shown for the two RO groups 503 and 505 of FIG. 5A. In the SSB-to-RO mapping 520, the BS 105 and/or the UE 115 may map the set of SSBs to the ROs 439 in the first group 503 and the ROs 439 in the second group 505 separately based on a mapping order. For simplicity of illustration and discussion, the mapping order is shown for a time-mapping order, where SSBs are sequentially mapped in an increasing number of time-domain ROs followed by an increasing number of PRACH slots.

Reference numeral 530 shows ROs 439a from the subframes #4 and #9 of the SFN #1 and #3 that are outside of the idle periods 304 of the FFPs 301 as discussed in to FIG. 5A. Reference numeral 540 shows ROs 439b and 439c from the subframes #4 and #9 of the SFN #1 and #3 that are at least partially overlapping with the idle periods 304 of the FFPs 301 as discussed in FIG. 5A. After grouping the ROs 439 as shown by the reference numerals 530 and 540, the BS 105 and/or the UE 115 may perform a two round of SSB-to-RO mapping to map the SSBs (the SSB #0, SSB #1, SSB #2, and SSB #3) to the ROs 439. The BS 105 and/or the UE 115 may perform SSB-to-RO mapping for the first group 503 (ROs 439a), followed by performing SSB-to-RO mapping for the second group 505 (ROs 439b and 439c). As shown, for the first group 503, SSB #0 is mapped to the RO 439a in the subframe #4 of SFN #1, SSB #1 is mapped to the RO 439a in the subframe #9 of SFN #1, SSB #2 is mapped to the RO 439a in the subframe #4 of SFN #3, and SSB #3 is mapped to the RO 439a in the subframe #9 of SFN #3. For the second group 505, SSB #0 is mapped to the RO 439b in the subframe #4 of SFN #1, SSB #1 is mapped to the RO 439c in the subframe #4 of SFN #1, SSB #2 is mapped to the RO 439b in the subframe #9 of SFN #1, SSB

3 is mapped to the RO 439c in the subframe #9 of SFN #1. After mapping all the SSBs in the set, the mapping may repeated for the remaining ROs in the second group 505. As shown, SSB #0 is mapped to the RO 439b in the subframe #4 of SFN #3, SSB #1 is mapped to the RO 439c in the subframe #4 of SFN #3, SSB #2 is mapped to the RO 439b in the subframe #9 of SFN #3, SSB #3 is mapped to the RO 439c in the subframe #9 of SFN #3. As can be observed in the exemplary aspects 530, 540, the BS 105 and/or the UE 115 may associate the same set of SSBs to the two groups 503 and 505, but may associate each SSB in the set of SSBs to a different number of ROs.

Although FIG. 5B illustrates an SSB-to-RO mapping in a time order, it should be understood in other examples an SSB-to-RO mapping can performed according to the following order: (1) in increasing preamble indices within a single RACH occasion; (2) in increasing number of frequency multiplexed RACH occasion; (3) in increasing number of time-domain RACH occasion within a RACH slot; (4) in increasing number of RACH slots. In some aspects, the number of SS/PBCH blocks associated to one RACH occasion is determined by a parameter SSB-per-rach-occasion. If SSB-per-rach-occasion is less than one, one SS/PBCH is mapped to 1/SSB-per-rach-occasion consecutive RACH occasions.

In some aspects, the BS 105 and/or the UE 115 may perform the SSB-to-RO mapping further based on an association period. The association period is the period to complete the association of the set of SSBs. For instance, the BS 105 may transmit each SSB in the set of SSBs at least once (e.g., in a sequential order) within the association period. FIGS. 6A-6D illustrate various mechanisms for the BS 105 and/or the UE 115 to perform SSB-to-RO mapping with consideration for association period.

FIG. 6A is a table 600 illustrating a PRACH period association configuration according to some aspects of the present disclosure. The table 600 shows mapping between RACH configuration period and number of configuration periods. Column 610 indicates RACH configuration periods (e.g., the PRACH configuration period 431 for the PRACH resource pattern 404 of FIG. 4B). Column 612 indicates allowable number of RACH configuration periods for an association period. For instance, for RACH configuration with a duration of 20 ms (as shown by the reference numeral 603), an association period can include 1 RACH period, 2 RACH periods, 4 RACH periods, or 8 RACH periods based on the mapping period set shown in column 612.

In an example, the BS 105 and/or the UE 115 may determine a PRACH configuration period from the PRACH Config Index described in FIG. 4A. After the BS 105 and/or the UE 115 determine the PRACH configuration period, the BS 105 and/or the UE 115 may determine a number of PRACH configuration period for an association period based on the table 600. For instance, if the BS 105 and/or the UE 115 determine that the RACH configuration is 20 ms, from the row 60, the BS 105 and/or the UE 115 can determine the mapping period set {1,2,4,8}. The BS 105 and/or the UE 115 may determine the number of multiple RACH configuration periods for an association time period by selecting a smallest value in the mapping period set such that all the transmitted SSBs can be mapped to ROs in the association period at least once.

The BS 105 and/or the UE 115 may select an association period for the first group and/or the second in a variety of ways as shown in shown in FIGS. 6B-6C below.

Figure 6B:
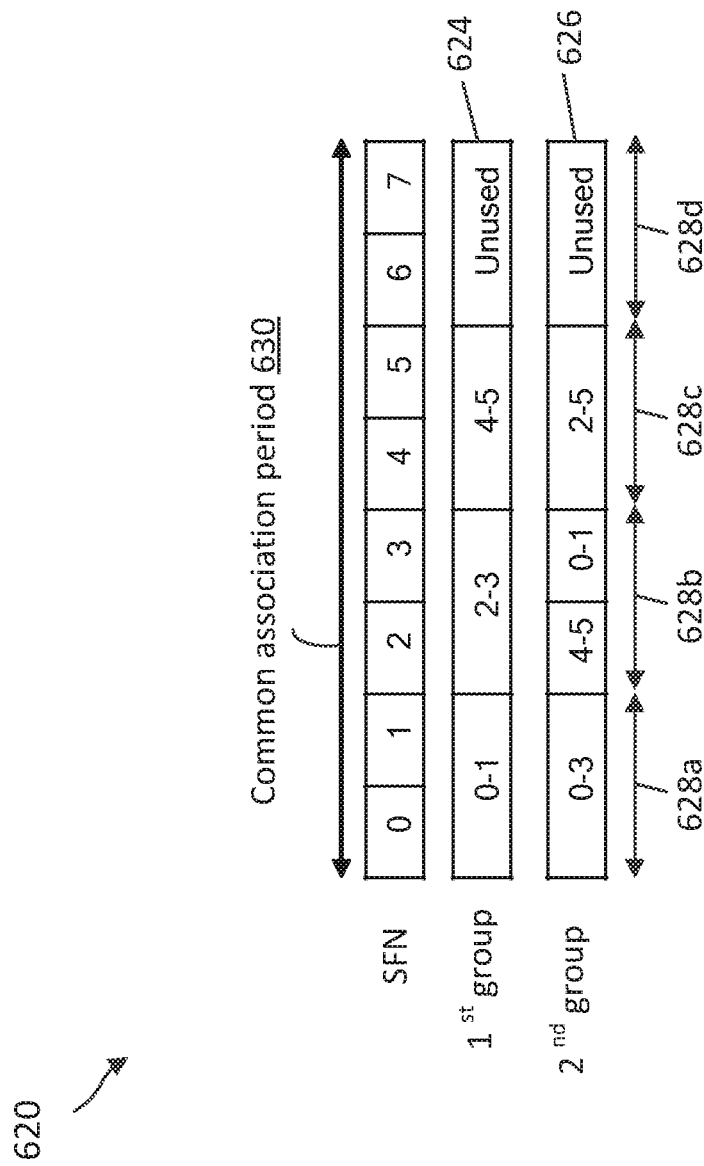
FIG. 6B illustrates an exemplary PRACH period association configuration according to some aspects of the present disclosure.

FIG. 6B illustrates an exemplary PRACH period association configuration 620 according to some aspects of the present disclosure. In the configuration 620, the BS 105 and/or the UE 115 may determine a maximum between the association period of group 1 and group 2 described in FIGS. 5A and 5B, and use it as the association period for mapping the set of SSBs to the ROs.

In some aspects, the BS 105 and/or the UE 115 determines a first association period based on at least one of a number of ROs of the first group in a random access configuration period, a number of SSBs in the set of SSBs, or a set of allowable association periods. For instance, the BS 105 and/or the UE 115 may divide the number of SSBs in the set by the number of ROs in a PRACH configuration period for the first group to produce a value. The BS 105 and/or the UE 115 may search for a smallest value in the mapping period set (e.g., shown in FIG. 6A) that is closest to value from the division. The BS 105 and/or the UE 115 determines a second association period based on at least one of a number of random access occasions of the second group in the random access configuration period, the number of SSBs in the set of SSBs, or the set of allowable association periods, for example, using similar mechanisms as for the first association period. The BS 105 and/or the UE 115 determines a common association period based on a maximum period between the first association period and the second association period. After determining the common association period, the BS 105 and/or the UE 115 may map the set of SSBs to the ROs in the first group based on the common association period, and map the set of SSBs to the ROs in the second group based on the common association period.

The exemplary configuration in FIG. 6B is illustrated for a set of SSBs including six SSBs (SSB indexed 0-5) and a PRACH configuration with a period 628 (shown as 628a, 628b, 628c, 628d) of 20 ms. Additionally, the PRACH configuration includes two ROs (outside of idle periods of FFPs) for the first group 624 and four ROs (at least partially overlapping with idle periods of FFPs) for the second group 626 in each PRACH configuration period. The first association period for the first group 624 may be computed by dividing 6 (number of SSBs in the set) by 2 (number of ROs of the first group 624 in the PRACH configuration period), which is 3. The smallest value in the mapping period set in FIG. 6 for a PRACH configuration period 628 of 20 ms (shown by the reference numeral 603) is 4. Thus, the first association period computed based on the first group 624 includes 4 PRACH periods, which corresponds to 80 ms.

Similarly, the second association period for the second group 626 may be computed by dividing 6 (number of SSBs in the set) by 4 (number of ROs of the second group 626 in the PRACH configuration period), which is 1.5. The smallest value in the mapping period set in FIG. 6 for a PRACH configuration period of 20 ms (shown by the reference numeral 603) is 2. Thus, the second association period computed based on the second group 626 includes 2 PRACH periods, which corresponds to 40 ms. The maximum between the first association period and the second association period is 80 ms (4 PRACH configuration periods). Thus, the common association period 630 is 80 ms (4 PRACH configuration periods).

The association period 630 is the maximum association period between the first association period and second association period, where the maximum period includes 4 PRACH periods 628. The selection of a maximum period between the first association period and the second association period allows the group with the less number of ROs per PRACH period to be able to map the complete set of SSBs to ROs in an association period. As shown, for the first group 624, SSBs 0 and 1 are mapped to ROs (e.g., the ROs 439)

in the PRACH period 628a, SSBs 2 and 3 are mapped to ROs in the PRACH period 628b, SSBs 4 and 5 are mapped to ROs in the PRACH period 628c. The ROs in the PRACH period 628d are unused or unmapped as a complete set of SSBs (6 SSBs) cannot fit into the ROs in the remaining PRACH period 628d. For the second group 626, SSBs 0-3 are mapped to ROs (e.g., the ROs 439) in the PRACH period 628a, SSBs 4-5 and SSBs 0-1 are mapped to ROs in the PRACH period 628b, SSBs 2-5 are mapped to ROs in the PRACH period 628c. The ROs in the PRACH period 628d are unused or unmapped as a complete set of SSBs (6 SSBs) cannot fit into the ROs in the remaining PRACH period 628d.

Figure 6C:
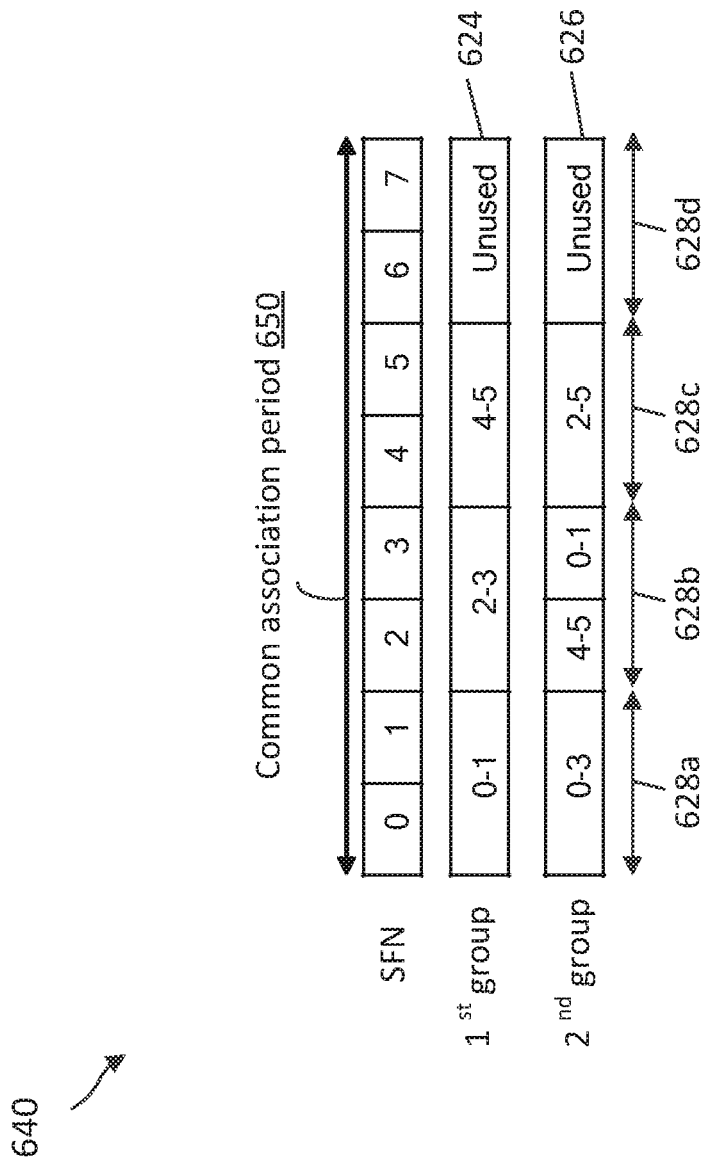
FIG. 6C illustrates an exemplary PRACH period association configuration according to some aspects of the present disclosure.

FIG. 6C illustrates an exemplary PRACH period association configuration 640 according to some aspects of the present disclosure. In the configuration 640, the BS 105 and/or the UE 115 determine the association period of the first group as the association for the first and second group, and use it as the association period for mapping the SSB-to-RO.

In some aspects, the BS 105 and/or the UE 115 determines a first association period based on at least one of a number of ROs of the first group in a random access configuration period, a number of SSBs in the set of SSBs, or a set of allowable association periods, for example, as discussed above in relation to FIG. 6B. The BS 105 and/or the UE 115 determines a common association period based on the first association period. After determining the common association period, the BS 105 and/or the UE 115 may map the set of SSBs to the ROs in the first group based on the common association period, and map the set of SSBs to the ROs in the second group based on the common association period.

Similar to FIG. 6B, the exemplary configuration in FIG. 6C is illustrated for a set of SSBs including six SSBs and a PRACH configuration with a period 628 of 20 ms. Additionally, the PRACH configuration includes two ROs (outside of idle periods of FFPs) for the first group 624 and four ROs (at least partially overlapping with idle periods of FFPs) for the second group 626. The first association period computed (as discussed in FIG. 6B) based on the first group 624 includes 2 PRACH periods, which corresponds to 40 ms. Thus, the common association period 650 based on the first association period for the first group 624 is 80 ms (4 PRACH configuration periods 628). Since the common association period 650 is the same as the common association period 630 in FIG. 6B, the SSBs 0-6 are mapped to the ROs in the PRACH period 628 in the same manner.

Figure 6D:
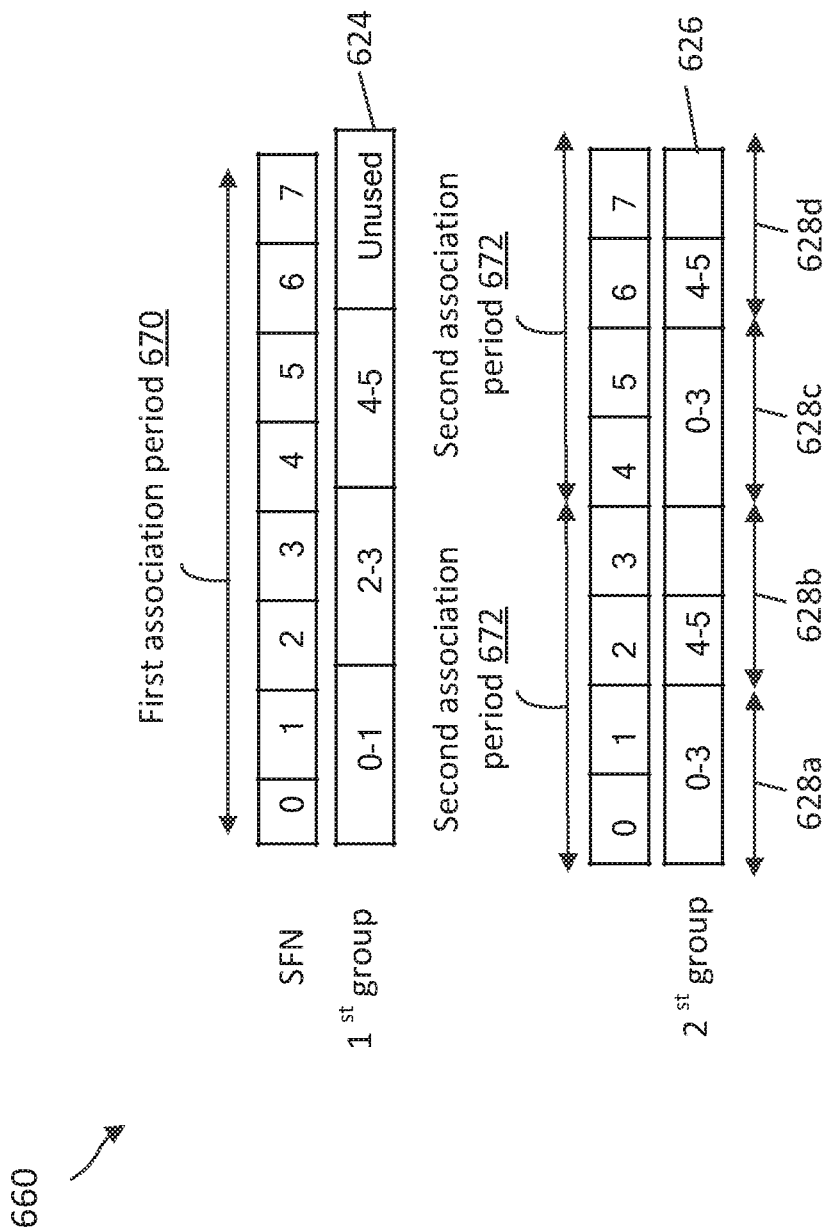
FIG. 6D illustrates an exemplary PRACH period association configuration according to some aspects of the present disclosure.

FIG. 6D illustrates an exemplary PRACH period association configuration 660 according to some aspects of the present disclosure. In the configuration 660, the BS 105 and/or the UE 115 uses two association periods for mapping the SSBs to ROs in the first group 624 and the second group 626.

In some aspects, the BS 105 and/or the UE 115 determines a first association period based on at least one of a number of ROs of the first group in a random access configuration period, a number of SSBs in the set of SSBs, or a set of allowable association periods. The BS 105 and/or the UE 115 determines a second association period based on at least one of a number of random access occasions of the second group in the random access configuration period, the number of SSBs in the set of SSBs, or the set of allowable association periods, for example, using similar mechanisms as for the first association period. After determining the corresponding association period, the BS 105 and/or the UE 115 may map the set of SSBs to the ROs in the first group based on the first association period, and map the set of SSBs to the ROs in the second group based on the second association period.

Similar to FIGS. 6B and 6C, the exemplary configuration in FIG. 6D is illustrated for a set of SSBs including six SSBs and a PRACH configuration with a period 628 of 20 ms. Additionally, the PRACH configuration includes two ROs (outside of idle periods of FFPs) for the first group 624 and four ROs (at least partially overlapping with idle periods of FFPs) for the second group 626. The first association period 670 computed (as discussed in FIG. 6B) based on the first group 624 includes 2 PRACH periods, which corresponds to 80 ms. The second association period 672 computed (as discussed in FIG. 6B) based on the second group 626 includes 2 PRACH periods, which corresponds to 40 ms.

As shown, for the first group 624, SSBs 0 and 1 are mapped to ROs (e.g., the ROs 439) in the PRACH period 628a, SSBs 2 and 3 are mapped to ROs in the PRACH period 628b, SSBs 4 and 5 are mapped to ROs in the PRACH period 628c based on an association using the first association period 670. The ROs in the PRACH period 628d are unused or unmapped as a complete set of SSBs (6 SSBs) cannot fit into the ROs in the remaining PRACH period 628d.

For the second group 626, SSBs 0-3 are mapped to ROs (e.g., the ROs 439) in the PRACH period 628a, and SSBs 4-5 are mapped to ROs in the PRACH period 628b based on an association using the second association period 672. The ROs in SFN 3 of the PRACH period 628b are unused or unmapped as a complete set of SSBs (6 SSBs) cannot fit into the ROs in the remaining PRACH period 628b. After mapping the complete set of SSBs in the second association period 672, the set of SSBs can be mapped to a next second association period 672 using similar mechanisms. As shown, SSBs 0-3 are mapped to ROs in the PRACH period 628c, and SSBs 4-5 are mapped to ROs in the PRACH period 628d based on based on an association using the second association period 672. Similarly, the ROs in SFN 7 of the PRACH period 628d are unused or unmapped as a complete set of SSBs (6 SSBs) cannot fit into the ROs in the remaining PRACH period 628d.

Figure 7:
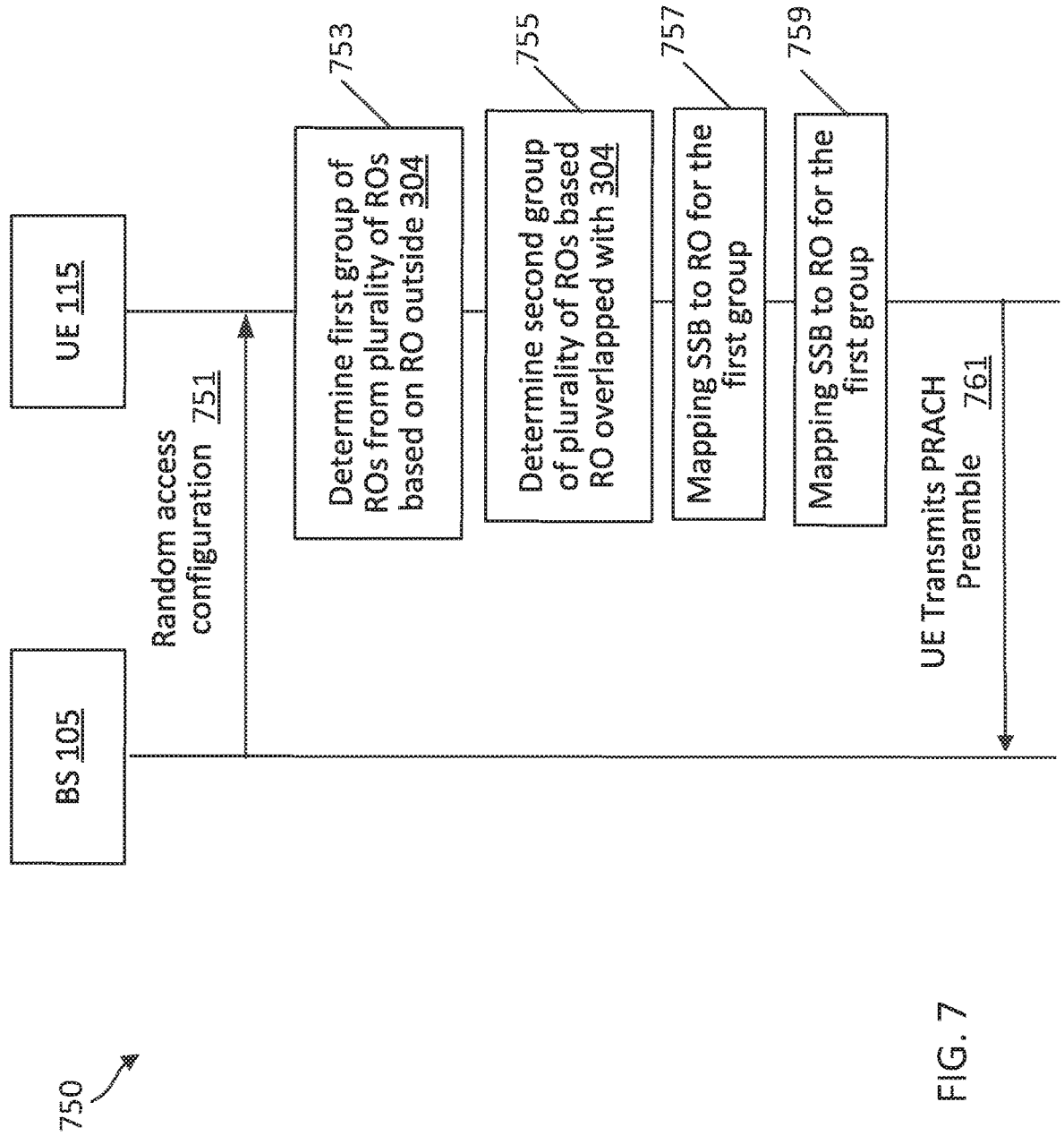
FIG. 7 is a sequence diagram illustrating a communication method according to some aspects of the present disclosure.

FIG. 7 is a sequence diagram illustrating a communication method 750 between the BS 105 and the UE 115 according to some aspects of the present disclosure. The method 750 may employ similar RO group and SSB-to-RO mapping mechanisms as discussed above in relation to FIGS. 5A-5B and 6A-6D. As illustrated, the method 750 includes a number of enumerated actions, but aspects of the method 750 may include additional actions before, after, and in between the enumerated actions. In some aspects, one or more of the enumerated actions may be omitted or performed in a different order.

In the method 750, the BS 105 may configure the UE 115 with an FBE configuration indicating a plurality of FFPs (e.g., the FFPs 301) as discussed above in relation to FIGS. 3 and 5A.

At step 751 the BS 105 transmits a random access configuration to the UE 115. As described previously, a PRACH configuration (the random access configuration) can be transmitted on DL BCH channel to the UE 115. From the PRACH configuration, the UE 115 determines the PRACH Config Index. The PRACH Config Index informs the UE 115 of ROs (e.g., the radio frame, subframe and symbol numbers where the ROs are located). In some aspects, the random access configuration may include a PRACH config index referencing a PRACH configuration in a preconfigured PRACH configuration table as shown in FIG. 4A.

At step 753, the UE 115 determines a first group of the ROs which are outside of the idle periods of the FFPs, for example, as discussed in relation to FIG. 5B. At step 755, the UE 115 determines a second group of ROs which are partially or fully overlapped with the idle period, for example, as discussed in relation to FIG. 5B. In some instances, the first group may correspond to the first group 503 and the second group may correspond to the second group 505 as shown in FIGS. 5A and 5B. In some instances, the first group may correspond to the first group 624 and the second group may correspond to the second group 626 as shown in FIGS. 6B-6D.

At step 757 the UE 115 performs a mapping procedure to map a set of SSBs to ROs in the first group. At step 759, the UE 115 performs a mapping procedure to map the set of SSBs to ROs in the second group. For instance, the UE 115 may determine a common association period for the first group and/or the second group and map SSBs in the set of SSBs sequentially to ROs in the first group and the second group separately based on the common association period as discussed above in FIG. 6B or 6C. Alternatively, the UE 115 may determine a first association period for the first group and a second association period for the second group, map SSBs in the set of SSBs sequentially to ROs in the first group based on the first association period, and map SSBs sequentially to ROs in the second group based on the second association period, as discussed above in FIG. 6D.

At step 761, the UE 115 transmits a PRACH preamble on the UL RACH channel to initiate connection with the BS 105. The UE 115 transmits the preamble a RO determined in the steps 753 and 755 and based on the SSB-to-RO mapping at steps 757 and 759. In an example, the UE 115 may receive an SSB index 0 from the BS 105. The UE 115 may determine a set of ROs that are associated with the SSB index 0 based on the grouping and SSB-to-RO mapping performed at steps 753, 755, 757, and 759. The set of ROs may include ROs that are outside of the idle periods of the FFPs and ROs that are at least partially overlapping with the idle periods of the FFPs. The UE 115 may transmit a PRACH preamble using a RO within the set of ROs associated with the SSB index 0. In some aspects, the UE 115 may initiate a 2-step random access procedure using the determine ROs. In some aspects, the UE 115 may initiate 4 2-step random access procedure using the determine ROs.

In some aspects, the BS 105 may perform the same steps 753, 755, and 757, and 759 as the UE 115 and perform random access preamble monitoring according to the determined ROs and SSB-to-RO mapping. In some aspects, the BS 105 may transmit the set of SSBs by sweeping across a plurality of beam directions. Thus, the UE 115 may further transmit the PRACH preamble in a beam direction corresponding to the beam direction of a SSB that is mapped to the RO. The BS 105 may perform random access preamble monitoring in an RO according to a beam direction of an SSB that is mapped to the RO.

FIG. 8 is a table 800 illustrating PRACH resource configurations according to some aspects of the present disclosure. For instance, a BS 105 may configure a UE 115 with two RACH configurations, a first RACH configuration with a PRACH pattern 803 (indicated by the PRACH Config index 75) and a second RACH configuration with a PRACH pattern 805 (indicated by the PRACH Config index 81). The first RACH configuration with the PRACH pattern 803 may corresponds to a legacy 3GPP Release 16 PRACH configuration. The second RACH configuration with the PRACH pattern 805 may be a new PRACH configuration as describe in the present disclosure.

The columns 810, 812, 814, 816, 818, 820, and 822 in FIG. 8 are substantially similar to the columns 410, 412, 414, 416, 418, 420, and 422 in FIG. 4A, respectively. For instance, according to the table 800, the PRACH resource pattern 803 includes 6 ROs (each with a duration of 2 symbols starting at symbol 0) in 2 PRACH slots within subframe #4 and 6 ROs (each with a duration of 2 symbols starting at symbol 0) in 2 PRACH slots within subframe #9 of a radio frame with SFN #1 and repeated every 2 radio frames. The PRACH resource pattern 805 includes 6 ROs (each with a duration of 2 symbols starting at symbol 0) in one PRACH slot within subframe #4 and 6 ROs (each with a duration of 2 symbols starting at symbol 0) in one PRACH slot within subframe #9 of a radio frame with SFN #0 and repeated every 1 radio frame.

Figure 9A:
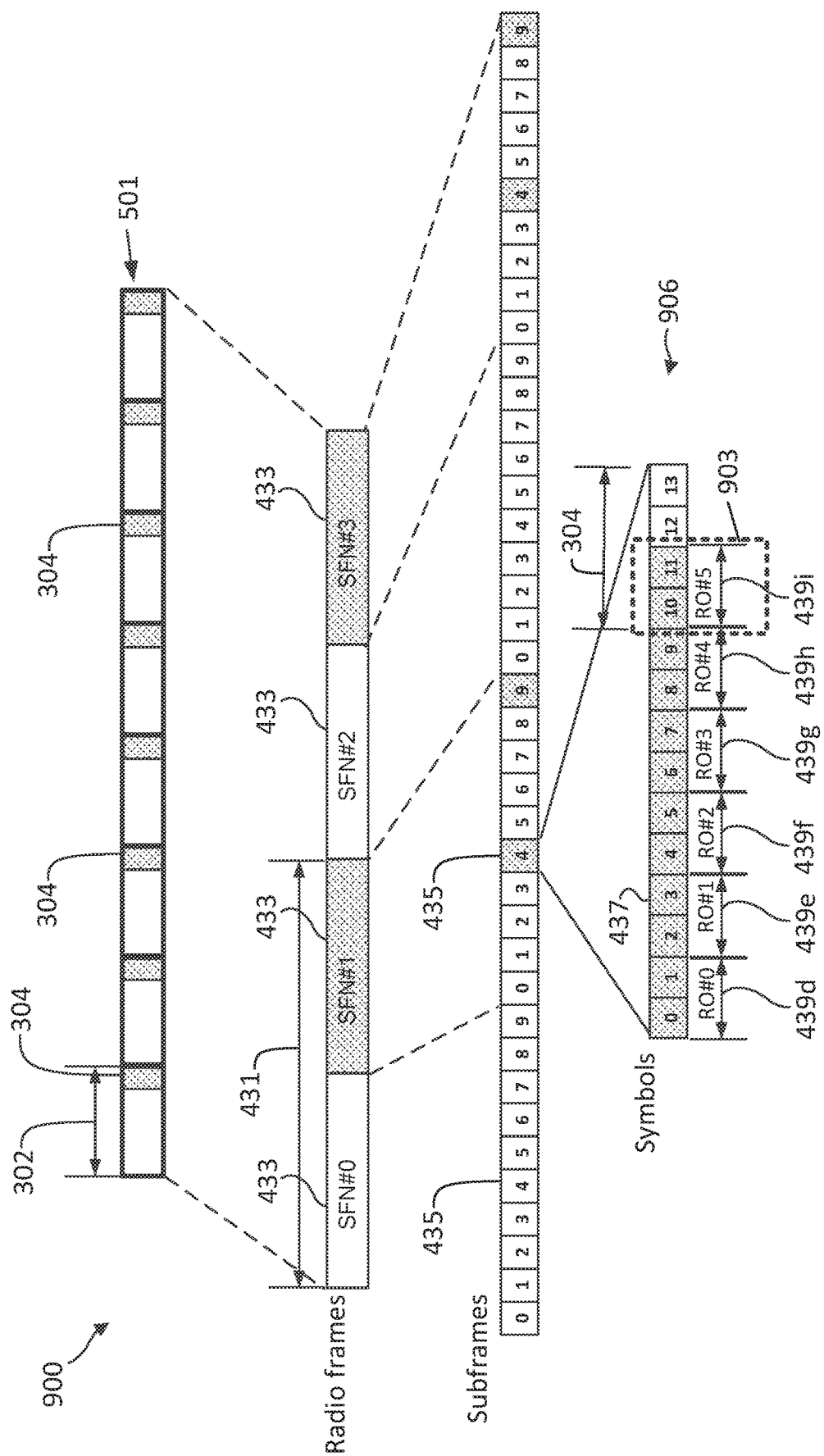
FIG. 9A illustrates a PRACH resource configuration according to some aspects of the present disclosure.
Figure 9B:
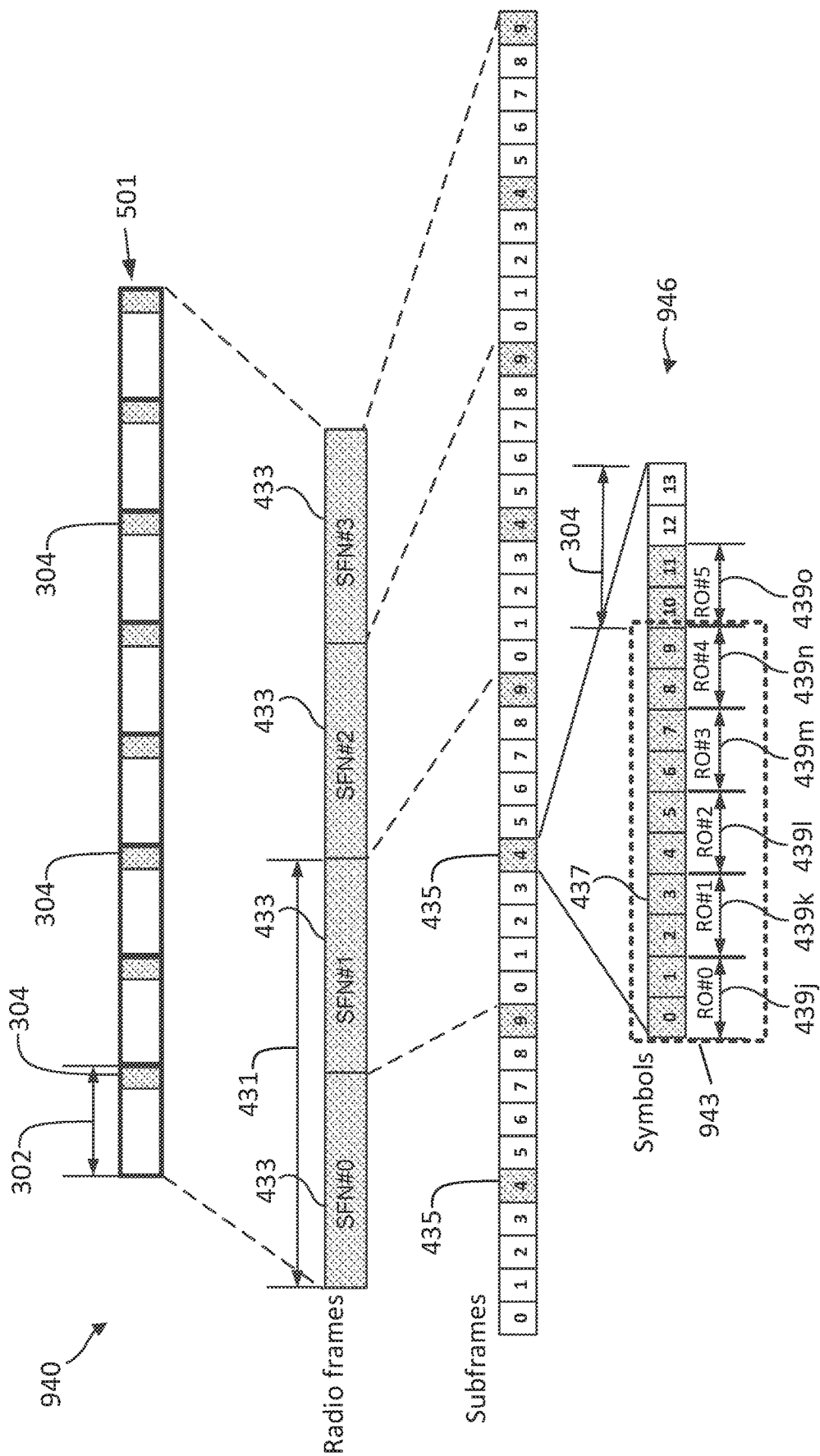
FIG. 9B illustrates a PRACH resource configuration according to some aspects of the present disclosure.

FIGS. 9A and 9B are discussed in relation to FIG. 8. FIG. 9A illustrates the PRACH resource configuration 900 according to some aspects of the present disclosure. The PRACH configuration 900 may correspond to the first configuration with the PRACH pattern 803 discussed in FIG. 8. FIG. 9A is described using the same frame structure as in FIG. 4B and the same FFP structure as in FIG. 5A, and may use the same reference numerals as in FIG. 4B and FIG. 5A for simplicity's sake. As shown, each radio frame 433 includes 10 subframes 435, and each subframe 435 includes 14 OFDM symbols 437. The radio frames 433 are indexed sequentially, for example, as SFN #0, SFN #1, SFN #2, and SFN #3. The symbols 437 are indexed sequentially from 0 to 13.

In the exemplary configuration 900, the pattern-filled boxes illustrate where ROs are located according to the PRACH pattern 803. For instance, subframe 4 of SFN 1 is configured with 6 ROs. As shown by the expanded view 906, the subframe 4 of SFN 1 includes ROs 439*d* to 439*i* starting at symbol 0. As discussed above, when the subcarrier spacing is 15 kHz, each FFP 301 may include an idle period 304 corresponding to about 4 symbols, for example, based on a 5% idle period restriction for FBE-based channel access. With the 5 ms FFPs 301 and 4 symbols idle periods 304, the subframe 4 of SFN 1 in the PRACH resource pattern 404 may include an idle period 304 in the last 4 symbols (symbols index 10 to 13) of the subframe 4. As such, the RO 439*i* (in the box 903) overlaps with the idle period 304. When an RO in the first configuration overlaps with an idle period of an FFP, the RO is considered as invalid in the FBE mode of operation. Thus, the RO 439*i* is invalid and may not be used for SSB-to-RO mapping or random access.

FIG. 9B illustrates a PRACH resource configuration 940 according to some aspects of the present disclosure. The PRACH resource configuration 940 may correspond to the second PRACH configuration with the PRACH pattern 805 discussed in FIG. 8. FIG. 9B is described using the same frame structure as in FIG. 4B and the same FFP structure as in FIG. 5A, and may use the same reference numerals as in FIG. 4B and FIG. 5A for simplicity's sake. As shown, each radio frame 433 includes 10 subframes 435, and each subframe 435 includes 14 OFDM symbols 437. The radio frames 433 are indexed sequentially, for example, as SFN #0, SFN #1, SFN #2, and SFN #3. The symbols 437 are indexed sequentially from 0 to 13.

In the exemplary configuration 940, the pattern-filled boxes illustrate where ROs are located according to the PRACH pattern 805. As shown by the expanded view 946, the subframe 4 of SFN 1 includes ROs 439d to 439i starting at symbol 0. As discussed above, when the subcarrier spacing is 15 kHz, each FFP 301 may include an idle period 304 corresponding to about 4 symbols, for example, based on a 5% idle period restriction for FBE-based channel access. With the 5 ms FFPs 301 and 4 symbols idle periods 304, the subframe 4 of SFN 1 in the PRACH resource pattern 404 may include an idle period 304 in the last 4 symbols (symbols index 10 to 13) of the subframe 4. As such, the RO 439i (in the box 903) overlaps with the idle period 304. When an RO in the second configuration does not at least overlaps with an idle period of an FFP, the RO is considered as invalid in the FBE mode of operation. Thus, the ROs 439j-439n are invalid and may not be used for SSB-to-RO mapping or random access.

In some aspects, the BS 105 may configure the UE 115 with the first PRACH configuration from legacy 3GPP Release 16 PRACH configurations as shown in FIG. 8, but may configure the UE 115 with a second PRACH configuration where ROs are all at least partially overlapping with idle periods (e.g., idle periods 304) of FFPs (e.g., the FFPs 301). For instance, the BS 105 may select subframes that overlaps with the idle periods of the FFPs and configure ROs in those subframes as will be discussed more fully below in FIGS. 10, 12-13, 14A-14B, 15A-15B, and 16A-16B.

FIG. 10 is a table 1000 illustrating PRACH resource configurations according to some aspects of the present disclosure. As shown, the PRACH configurations define FFP lengths (e.g., duration of FFPs 301), idle period length (e.g., duration of idle periods 304), and the subframe numbers allowed for the ROs for both 15 kHz and 30 kHz. In order to place or allocate the ROs in the idle period 304, the BS 105 may perform the following mechanism (i) For a given FFP configuration, only all or a subset of subframes number X can be configured. (ii) Only one PRACH slot within subframe can be configured with ROs (ii) determine a staring symbol and a number of ROs such that the ROs are fully or partially overlapped with the idle period of a corresponding FFP.

In some aspects, in order to properly place the ROs partially or fully overlapped with the symbols in the idle period of the legacy first PRACH configuration, the BS 105 may perform the following procedure (i) determine a starting symbol such that an earliest RO in a RACH slot is partially or fully overlapped with symbols in the idle period (ii) determine a number of ROs in the PRACH slot as the number of ROs that are within the idle period of a corresponding FFP as will be discussed more fully below with reference to FIGS. 14A-14B and 15A-15B.

In some other aspects, in order to place or allocate all the ROs to be within the idle periods of FFPs, the BS 105 may perform the following procedure (i) determine a starting symbol such that the starting symbol of an earliest RO is fully within a RACH slot and is at least one symbol offset from a starting symbol of the idle period and the remaining ROs are appended to the earliest RO without any gaps to the end of the PRACH slot (ii) determine a number of ROs in the PRACH slot as the number of ROs starting from the earliest RO to the last RO within the PRACH slot (iii) For PRACH preamble format A1/A2/A3, determine the last RO within the PRACH slot such that at least one symbol Guard Period (GP) is between the last symbol of the last RO and the end of the PRACH slot as will be discussed more fully below with reference to FIGS. 16A-16B.

Figure 11:
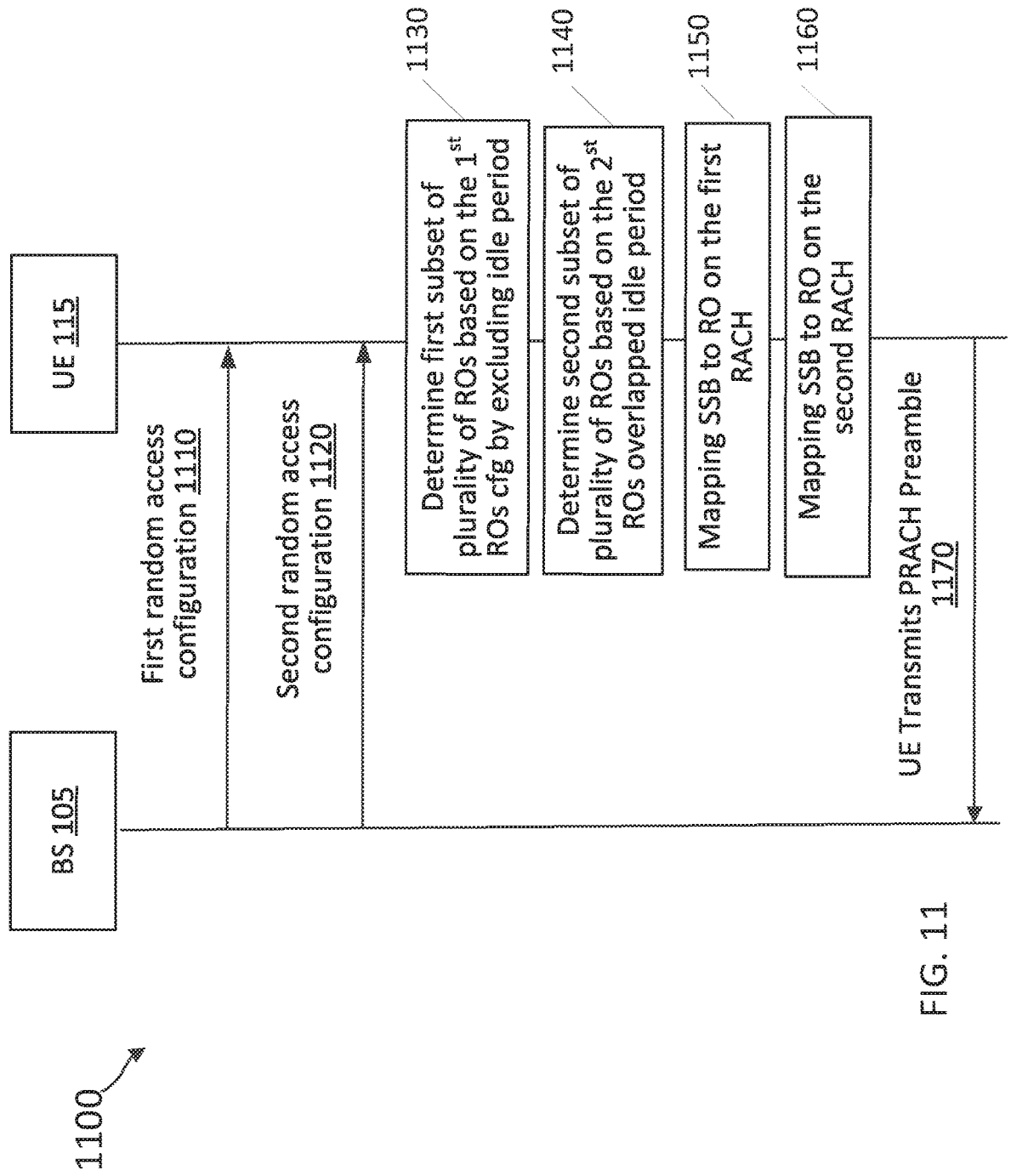
FIG. 11 is a sequence diagram illustrating a communication method according to some aspects of the present disclosure.

FIG. 11 is a sequence diagram illustrating a communication method 1100 between the BS 105 and the UE 115 according to some aspects of the present disclosure. The method 1100 may employ similar mechanisms as discussed above in relation to FIGS. 8, 9A-9B and 10. As illustrated, the method 1100 includes a number of enumerated actions, but aspects of the method 1100 may include additional actions before, after, and in between the enumerated actions. In some aspects, one or more of the enumerated actions may be omitted or performed in a different order.

In the method 1100, the BS 105 may configure the UE 115 with an FBE configuration indicating a plurality of FFPs (e.g., the FFPs 301) as discussed above in relation to FIGS. 3, 8, 9A-9B, and 10.

At step 1110, the BS 105 transmits a first random access configuration to the UE 115. The first random access configuration may indicate a first set of ROs in a plurality of FFPs. The first random access configuration may be legacy 3GPP Release 15 PRACH configuration, for example, as shown in FIG. 8. For instance, the first random access configuration may indicate a PRACH config index referencing a PRACH configuration in a preconfigured PRACH configuration table similar to FIG. 8.

At step 1120, the BS 105 transmits a second random access configuration to the UE 115. The second random access configuration may indicate a second set of ROs in a plurality of FFPs. In some instances, the second random access configuration may indicate a PRACH config index referencing a PRACH configuration in a preconfigured PRACH configuration table similar to FIG. 8. In some other instances, the second random access configuration may only include ROs that are partially overlapping or fully overlapping with idle periods of FFPs as discussed above in relation to FIG. 10 as further below in FIGS. 14A-14B, 15A-15B, and 16A-16B.

In some aspects, the BS 105 may transmit the first and second random access configurations on a DL BCH channel to the UE 115. The UE 115 may determine the PRACH Config Index from the first PRACH configuration and/or from the second PRACH configuration, for example, depending on whether the UE supports the use of ROs in idle periods of FFPs. For instance, if the UE 115 is a legacy 3GPP Release 16 UE, the UE 115 may not support the use of ROs in idle periods of FFPs. Alternatively, if the UE 115 is an enhanced UE, the UE 115 may support the use of ROs in idle periods of FFPs as discussed in the present disclosure. The PRACH Config Index informs the UE 115 of the frame, subframe and symbol number of the ROs.

The UE 115 may determine a plurality of ROs based on the first random access configuration and the second random access configuration. For instance, at step 1130, the UE 115 determines, based on the first random access configuration, a first subset of the plurality of ROs by excluding any ROs in the first set of ROs that are at least partially overlapping with idle periods of FFPs (not fully within the CoTs of the FFPs), for example, as discussed above in relation to FIG. 9A.

At step 1140, the UE 115 determines, based on the second random access configuration, a second subset of the plurality of ROs by excluding any RO in the second set of random access occasions that is not at least partially overlapping with the idle periods of the FFPs (fully within the CoTs of the FFPs), for example, as discussed above in relation to FIG. 9B.

At step 1150 the UE 115 performs a mapping procedure to map a set of SSBs to ROs in the first subset of ROs. At step 1160, the UE 115 performs a mapping procedure to map the set of SSBs to ROs in the second subset of ROs. For instance, the UE 115 may determine a common association period for the first subset of ROs (the first group) and/or the second subset of ROs (the second group) and map SSBs in the set of SSBs sequentially to ROs in the first subset of ROs and the second subset of ROs separately based on the common association period as discussed above in FIG. 6B or 6C. Alternatively, the UE 115 may determine a first association period for the first subset of ROs (the first group) and a second association period for the second subset of ROs (the second group), map SSBs in the set of SSBs sequentially to ROs in the first subset of ROs based on the first association period, and map SSBs sequentially to ROs in the second subset of ROs based on the second association period, as discussed above in FIG. 6D.

At step 1160, the UE 115 transmits a PRACH preamble on the UL RACH channel to initiate connection with the BS 105. The UE 115 transmits the preamble on ROs determined in the step 1120 and 1130 and based on the SSB-to-RO mapping at steps 1140 and 1150. In an example, the UE 115 may receive an SSB index 0 from the BS 105. The UE 115 may determine a set of ROs that are associated with the SSB index 0 based on the grouping and SSB-to-RO mapping performed at steps 1110, 1120, 1130, and 1140. The set of ROs may include ROs that are outside of the idle periods of the FFPs and ROs that are at least partially overlapping with the idle periods of the FFPs. The UE 115 may transmit a PRACH preamble using a RO within the set of ROs associated with the SSB index 0. In some aspects, the UE 115 may initiate a 2-step random access procedure using the determine ROs. In some aspects, the UE 115 may initiate a 4-step random access procedure using the determine ROs.

In some aspects, the BS 105 may perform the same steps 753, 755, and 757, and 759 as the UE 115 and perform random access preamble monitoring according to the determined ROs and SSB-to-RO mapping. In some aspects, the BS 105 may transmit the set of SSBs by sweeping across a plurality of beam directions. Thus, the UE 115 may further transmit the PRACH preamble in a beam direction corresponding to the beam direction of a SSB that is mapped to the RO. The BS 105 may perform random access preamble monitoring in an RO according to a beam direction of an SSB that is mapped to the RO.

In some aspects, a BS 105 may configure a UE 115 to operate in an FBE mode and may configure a PRACH resource configuration specific for FBE mode of operations. For instance, the BS 105 may configure the PRACH resources configuration such that all ROs are partially overlapping with idle periods of FFPs or fully within idle periods of FFPs, as discussed above in relation to FIG. 10.

In some aspects, in order to properly place the ROs partially or fully overlapped with the symbols in the idle period of the legacy first PRACH configuration, the BS 105 may perform the following procedure (i) determine a starting symbol such that an earliest RO in a RACH slot is partially or fully overlapped with symbols in the idle period (ii) determine a number of ROs in the PRACH slot as the number of ROs that are within the idle period of a corresponding FFP. FIGS. 12-13, 14A-14B, and 15A-15B illustrate various exemplary PRACH resource configurations where the BS 105 utilize such a procedure.

FIG. 12 is a table 1200 illustrating PRACH resource configurations according to some aspects of the present disclosure. The PRACH resource configurations illustrate exemplary PRACH patterns in a PRACH slot for a 10 ms FFP (e.g., the FFPs 301) and a 15 kHz SCS. The table 1200 may be suitable for use to define ROs where an earliest RO in a PRACH slot is at least partially overlapping with the idle period (e.g., the idle period 304) of a corresponding FFP.

In some aspects, the PRACH pattern shown in the exemplary Table 1200, may be used by the BS 105. For instance, the BS 105 may broadcast a PRACH configuration (e.g., in a SIB-1) indicating a PRACH configuration index referencing a row in the table 1200. In some other aspects, the UE 115 may use the PRACH pattern shown in the exemplary Table 1200 to determine the ROs as described in FIG. 11. For instance, the second random access configuration received at step 1130 may include a PRACH configuration index referencing a row in the table 1200. Various PRACH configuration for 15 kHz SCS with other FFP values (durations) are shown in the appendix.

FIG. 13 is a table 1300 illustrating PRACH resource configurations according to some aspects of the present disclosure. The PRACH resource configurations illustrate exemplary PRACH patterns in a PRACH slot for a 10 ms FFP (e.g., the FFPs 301) and a 30 kHz SCS. The table 1300 may be suitable for use to define ROs where an earliest RO in a PRACH slot is at least partially overlapping with the idle period (e.g., the idle period 304) of a corresponding FFP.

In some aspects, the PRACH pattern shown in the exemplary Table 1300, may be used by the BS 105. For instance, the BS 105 may broadcast a PRACH configuration (e.g., in a SIB-1) indicating a PRACH configuration index referencing a row in the table 1300. In some other aspects, the UE 115 may use the PRACH pattern shown in the exemplary Table 1300 to determine the ROs as described in FIG. 11. For instance, the second random access configuration received at step 1130 may include a PRACH configuration index referencing a row in the table 1300. Various PRACH configuration for 30 kHz SCS with other FFP values (durations) are shown in the appendix.

Figure 14A:
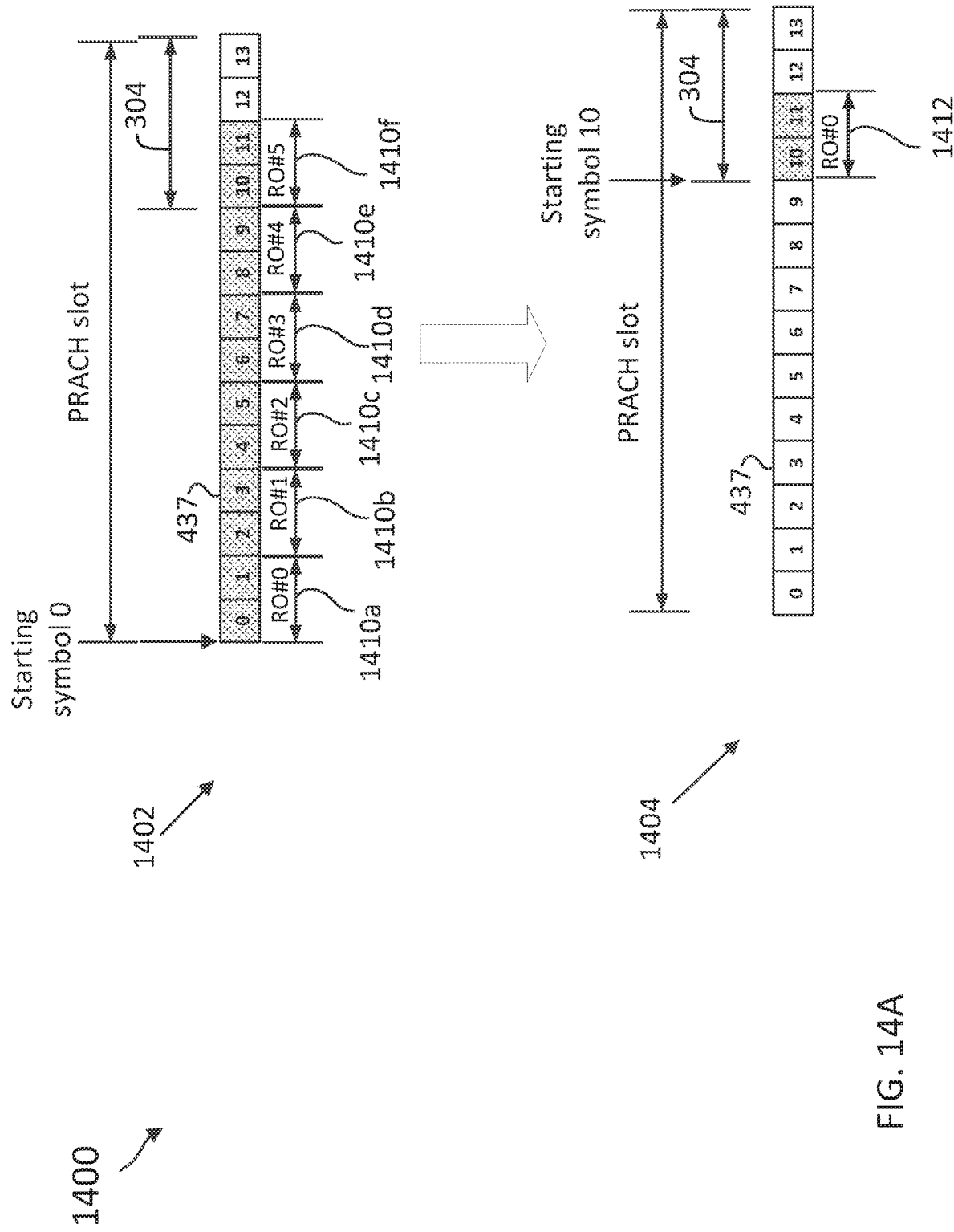
FIG. 14A illustrates a PRACH resource configuration according to some aspects of the present disclosure.

FIG. 14A illustrates a PRACH resource configuration 1400 according to some aspects of the present disclosure. The configuration 1400 includes an RO pattern 1402 and an RO pattern 1404 for an SCS of 15 kHz. With the SCS of 15 kHz and 5 ms FFPs, the idle period 304 may include a duration of about 4 symbols. The RO pattern 1402 may be a legacy 3GPP Release 16 PRACH pattern. The RO pattern 1402 includes ROs 1410*a*-1410*f* in a PRACH slot starting at symbol 0, where the ROs 1410*a*-1410*e* are outside of the idle period 304. The RO pattern 1404 is determined from the RO pattern 1402, for example, by (i) determining a starting symbol such that an earliest RO in a RACH slot is partially or fully overlapped with symbols in the idle period 304 (*ii*) determining a number of ROs in the PRACH slot as the number of ROs that are within the idle period of a corresponding FFP. As shown, the starting symbol for the RO pattern 1404 in the PRACH slot is symbol 10 and the number of RO in the PRACH slot is one (e.g., including RO 1412).

Figure 14B:
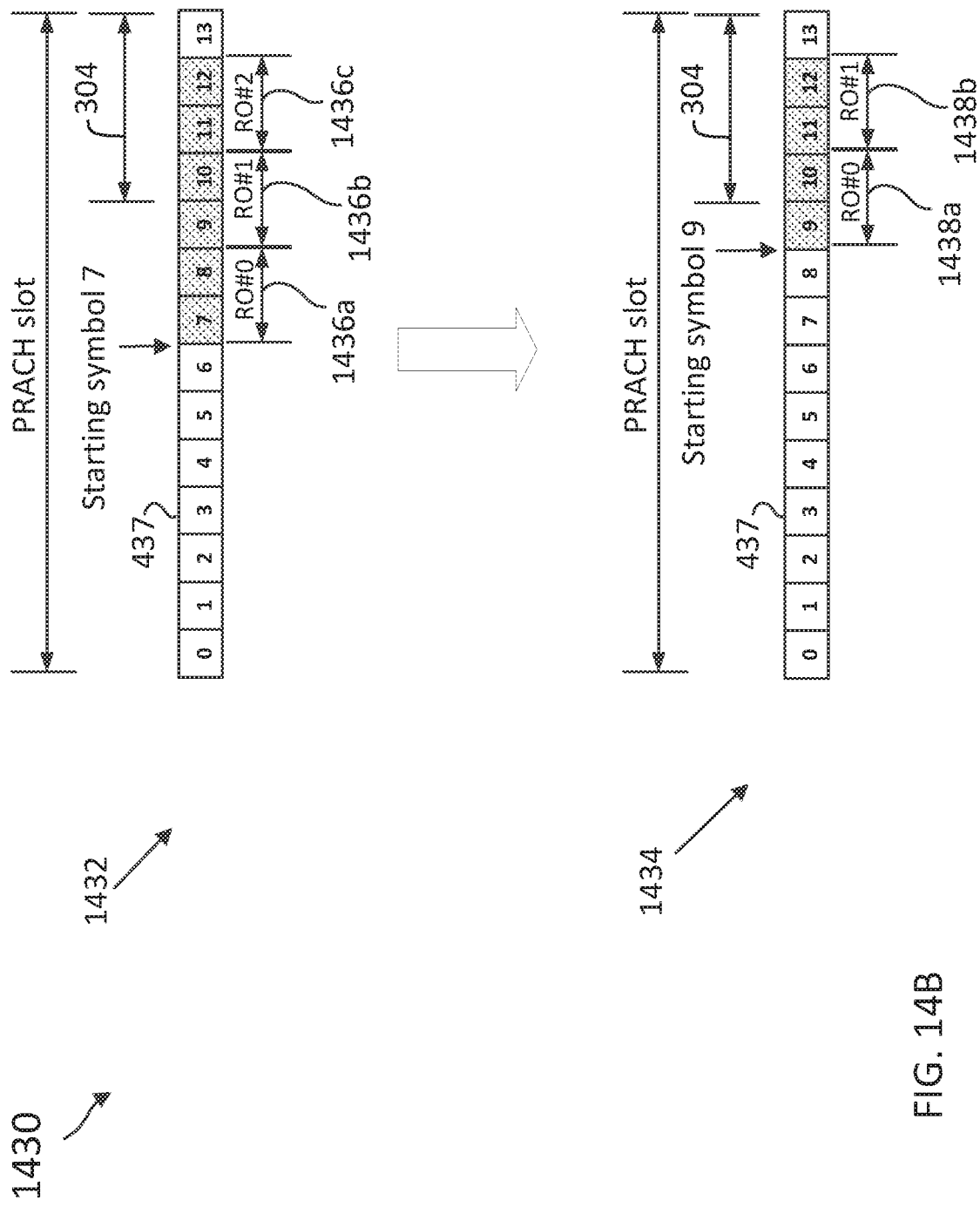
FIG. 14B illustrates a PRACH resource configuration according to some aspects of the present disclosure.

FIG. 14B illustrates a PRACH resource configuration 1430 according to some aspects of the present disclosure. The configuration 1430 includes an RO pattern 1432 and an RO pattern 1434 for an SCS of 15 kHz. With the SCS of 15 kHz and 5 ms FFPs, the idle period 304 may include a duration of about 4 symbols. The RO pattern 1432 may be a legacy 3GPP Release 16 PRACH pattern. The RO pattern 1432 includes ROs 1436*a*-1436*c* in a PRACH slot starting at symbol 7 where the RO 1436*a* is outside of the idle period 304. The RO pattern 1434 is determined from the RO pattern 1432, for example, by (i) determining a starting symbol such that an earliest RO in a RACH slot is partially or fully overlapped with symbols in the idle period 304 (*ii*) determining a number of ROs in the PRACH slot as the number of ROs that are within the idle period of a corresponding FFP. As shown, the starting symbol for the RO pattern 1434 in the PRACH slot is symbol 9 and the number of RO in the PRACH slot is two (e.g., including ROs 1438a and 1438b).

Figure 15A:
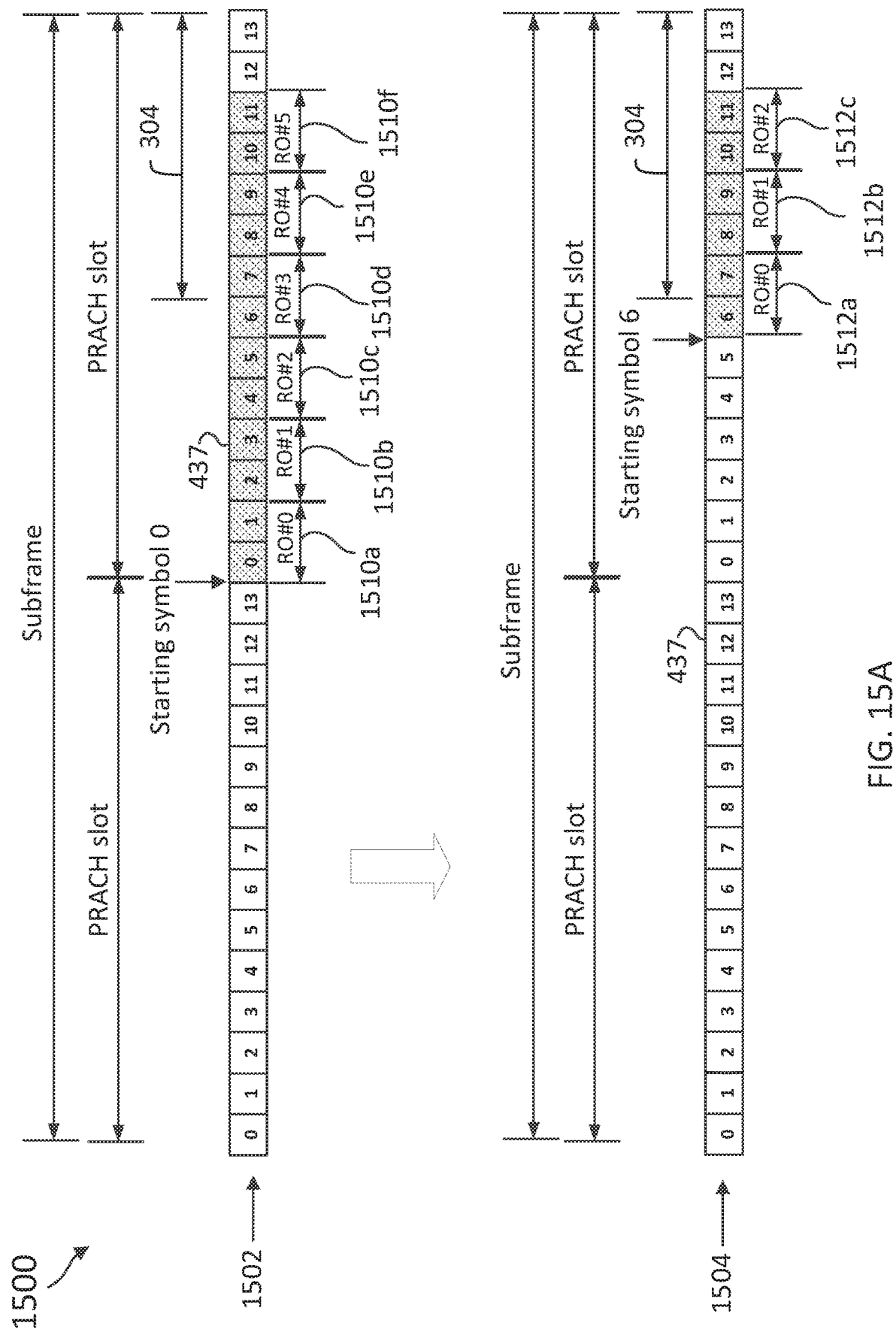
FIG. 15A illustrates a PRACH resource configuration according to some aspects of the present disclosure.

FIG. 15A illustrates a PRACH resource configuration 1500 according to some aspects of the present disclosure. The configuration 1500 includes an RO pattern 1502 and an RO pattern 1504 for an SCS of 30 kHz where a subframe may include 2 PRACH slots. With the SCS of 30 kHz and 5 ms FFPs, the idle period 304 may include a duration of about 7 symbols. The RO pattern 1502 may be a legacy 3GPP Release 16 PRACH pattern. The RO pattern 1502 includes ROs 1510a-1510f in a second PRACH (of a subframe) slot starting at symbol 0, where the ROs 1510a-1512c are outside of the idle period 304. The RO pattern 1504 is determined from the RO pattern 1502, for example, by (i) determining a starting symbol such that an earliest RO in a RACH slot is partially or fully overlapped with symbols in the idle period 304 (ii) determining a number of ROs in the PRACH slot as the number of ROs that are within the idle period of a corresponding FFP. As shown, the starting symbol for the RO pattern 1504 in the PRACH slot is symbol 6 and the number of RO in the PRACH slot is three (e.g., including RO 1512a, 1512b, and 1512c).

Figure 15B:
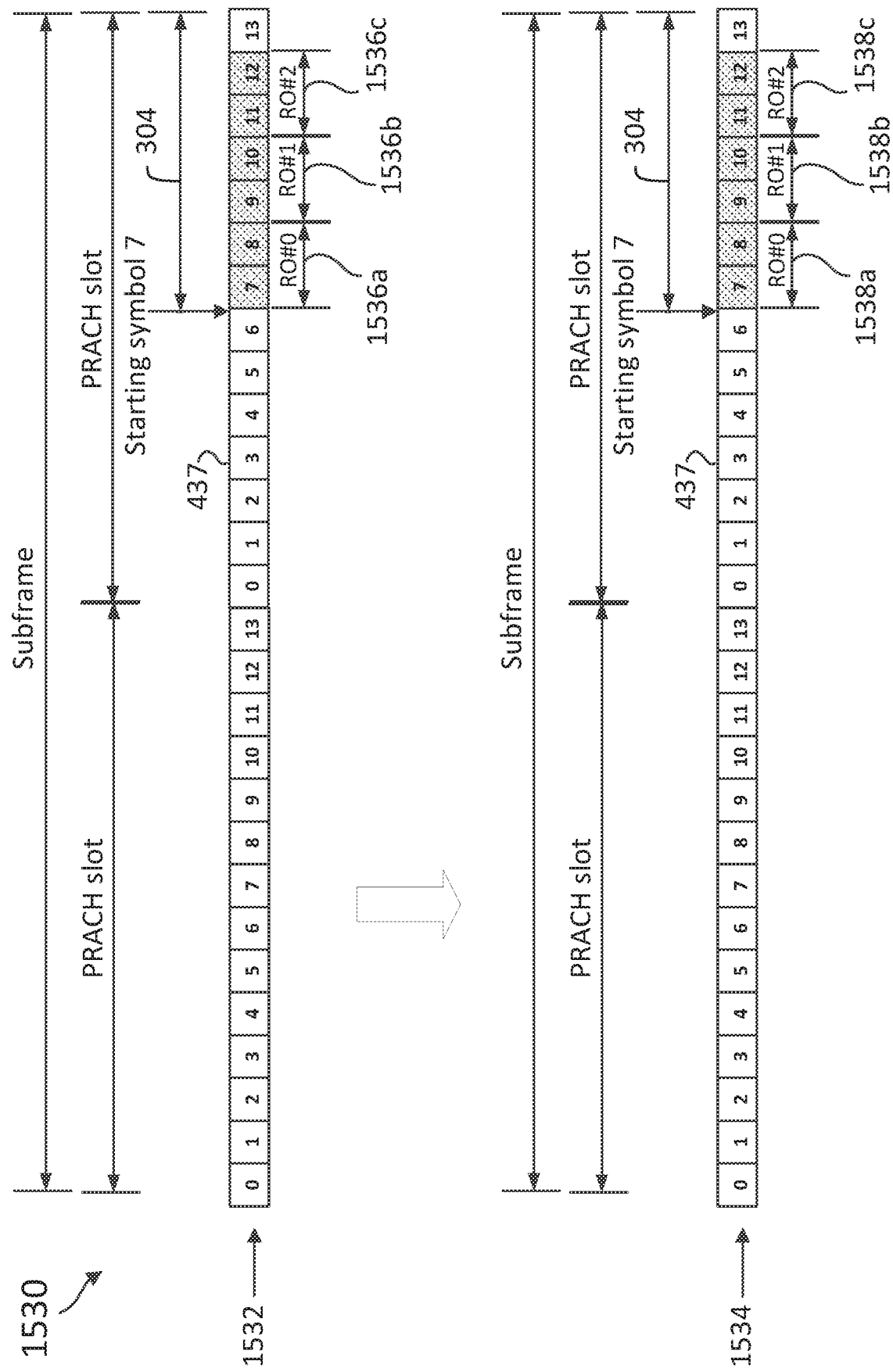
FIG. 15B illustrates a PRACH resource configuration according to some aspects of the present disclosure.

FIG. 15B illustrates a PRACH resource configuration 1530 according to some aspects of the present disclosure. The configuration 1530 includes an RO pattern 1532 and an RO pattern 1534 for an SCS of 30 kHz where a subframe may include 2 PRACH slots. With the SCS of 30 kHz and 5 ms FFPs, the idle period 304 may include a duration of about 7 symbols. The RO pattern 1532 may be a legacy 3GPP Release 16 PRACH pattern. The RO pattern 1532 includes ROs 1536a-1536c in a second PRACH (of a subframe) slot starting at symbol 7, where no RO is outside of the idle period 304. The RO pattern 1534 is determined from the RO pattern 1532, for example, by (i) determining a starting symbol such that an earliest RO in a RACH slot is partially or fully overlapped with symbols in the idle period 304 (ii) determining a number of ROs in the PRACH slot as the number of ROs that are within the idle period of a corresponding FFP. As shown, the starting symbol for the RO pattern 1534 in the PRACH slot remains at symbol 7 and the number of RO in the PRACH slot remains at three (e.g., including RO 1538a, 1538b, and 1538c).

FIGS. 16A-16B illustrates exemplary PRACH resource configurations where ROs are mapped within idle periods of FFPs and offset from at least one of a starting symbol or an ending symbol of the idle periods.

FIG. 16A illustrates a PRACH resource configuration 1600 according to some aspects of the present disclosure. The configuration 1600 includes an RO pattern 1602 for an SCS of 15 kHz where a subframe may include 1 PRACH slot. With the SCS of 15 kHz and 5 ms FFPs, the idle period 304 may include a duration of about 4 symbols. For instance, the RO pattern 1602 may be determined from the RO pattern 1402 shown in FIG. 14, for example, by (i) determine a starting symbol such that the starting symbol of an earliest RO is fully within a RACH slot and is at least one symbol offset from a starting symbol of the idle period and the remaining ROs are appended to the earliest RO without any gaps to the end of the PRACH slot (ii) determine a number of ROs in the PRACH slot as the number of ROs starting from the earliest RO to the last RO within the PRACH slot and (iii) determine the last RO within the PRACH slot such that at least one symbol Guard Period (GP) is between the last symbol of the last RO and the end of the PRACH slot. As shown, the RO pattern 1602 includes ROs 1612 within the idle period 304, where the starting symbol 1614 of the earliest RO 1612 in the PRACH slot is within the idle period 304 and has one symbol offset from the starting symbol 1616 of the idle period 304. The remaining ROs 1612 (if any) are appended without any gap to the first RO 1612a. As shown, the starting symbol for the RO pattern 1602 in the PRACH slot is at symbol 11 and the number of RO in the PRACH slot is one (e.g., including RO 1610).

FIG. 16B illustrates a PRACH resource configuration 1630 according to some aspects of the present disclosure. The configuration 1630 includes an RO pattern 1632 for an SCS of 30 kHz where a subframe may include 2 PRACH slots. With the SCS of 30 kHz and 5 ms FFPs, the idle period 304 may include a duration of about 7 symbols. For instance, the RO pattern 1632 may be determined from the RO pattern 1502 shown in FIG. 15, for example, by (i) determine a starting symbol such that the starting symbol of an earliest RO is fully within a RACH slot and is at least one symbol offset from a starting symbol of the idle period and the remaining ROs are appended to the earliest RO without any gaps to the end of the PRACH slot (ii) determine a number of ROs in the PRACH slot as the number of ROs starting from the earliest RO to the last RO within the PRACH slot and (iii) determine the last RO within the PRACH slot such that at least one symbol Guard Period (GP) is between the last symbol of the last RO and the end of the PRACH slot. As shown, the RO pattern 1632 includes ROs 1634 within the idle period 304, where the starting symbol 1636 of the earliest RO 1634a in the PRACH slot is within the idle period 304 and has one symbol offset from the starting symbol 1638 of the idle period 304. The remaining ROs 1634 are appended without any gap to the first RO 1634a. As shown, the starting symbol for the RO pattern 1632 in the PRACH slot is at symbol 8 and the number of RO in the PRACH slot is two (e.g., including ROs 1634a and 1634b).

Figure 17:
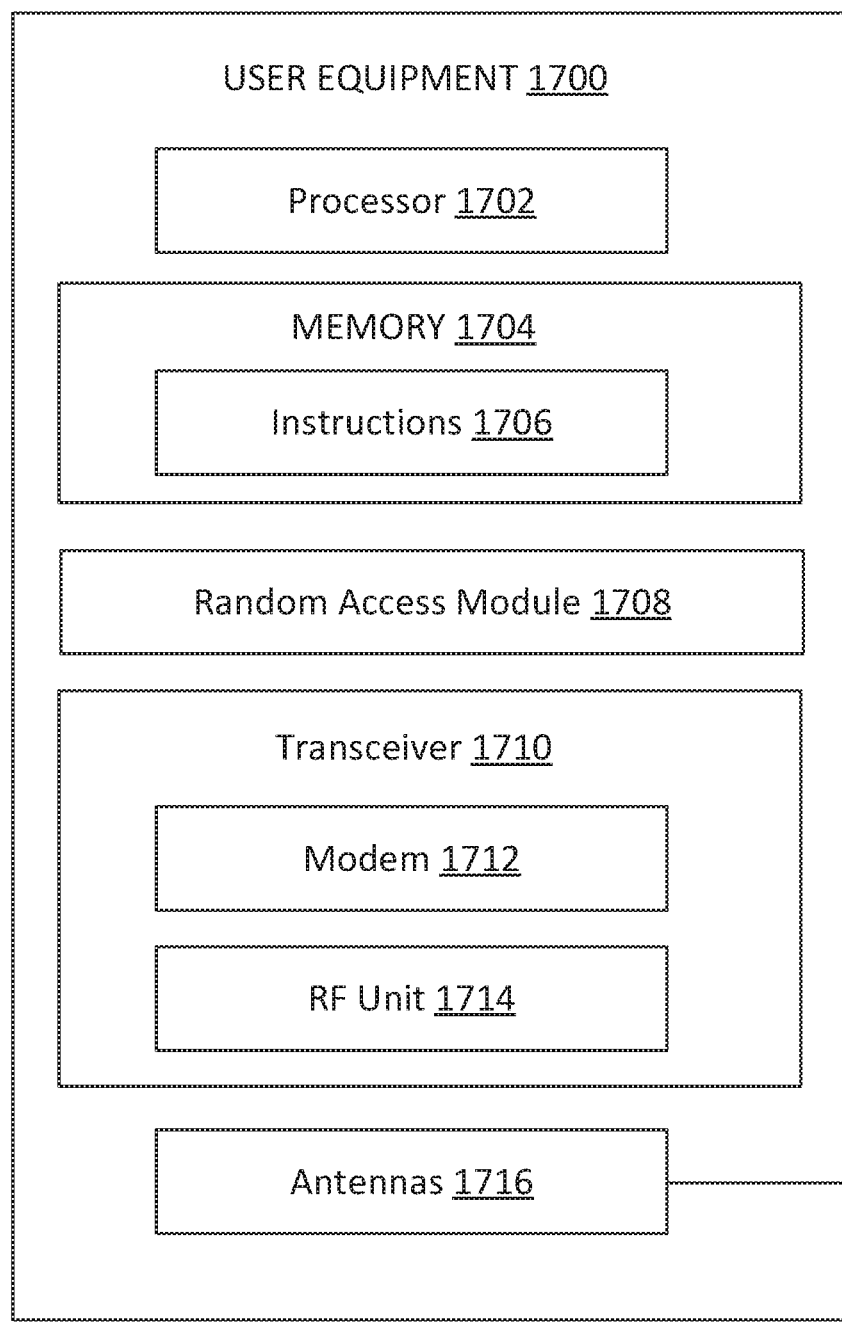
FIG. 17 is a block diagram of an exemplary user equipment (UE) according to some aspects of the present disclosure.

FIG. 17 is a block diagram of an exemplary UE 1700 according to some aspects of the present disclosure. The UE 1700 may be a UE 115 in the network 100 as discussed above in FIG. 1. As shown, the UE 1700 may include a processor 1702, a memory 1704, a random access module 1708, a transceiver 1710 including a modem subsystem 1712 and a RF unit 1714, and one or more antennas 1716. These elements may be in direct or indirect communication with each other, for example via one or more buses.

The processor 1702 may have various features as a specific-type processor. For example, these may include a CPU, a DSP, an ASIC, a controller, a FPGA device, another hardware device, a firmware device, or any combination thereof configured to perform the operations described herein. The processor 1702 may also be implemented as a combination of computing devices, e.g., a combination of a DSP and a microprocessor, a plurality of microprocessors, one or more microprocessors in conjunction with a DSP core, or any other such configuration.

The memory 1704 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1704 may include a non-transitory computer-readable medium. The memory 1704 may store instructions 1706. The instructions 1706 may include instructions that, when executed by the processor 1702, cause the processor 1702 to perform operations described herein, for example, aspects of FIGS. 2-16B. Instructions 1706 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The random access module 1708 may be implemented via hardware, software, or combinations thereof. For example, the random access module 1708 may be implemented as a processor, circuit, and/or instructions 1706 stored in the memory 1704 and executed by the processor 1702. In some instances, the random access module 1708 can be integrated within the modem subsystem 1712. For example, the random access module 1708 can be implemented by a combination of software components (e.g., executed by a DSP or a general processor) and hardware components (e.g., logic gates and circuitry) within the modem subsystem 1712.

The random access module 1708 may communicate with various components of the UE 1700 to implement various aspects of the present disclosure, for example, aspects of FIGS. 2-16B. In some aspects, the random access module 1708 is configured to cause the UE 1700 to transmit, to a BS (e.g., the BSs 105), a PRACH preamble in ROs indicated by the BS 105 within an unlicensed radio frequency band. In this regard, the random access module 1708 may be configured to determine a plurality of ROs based on one or more random access configuration(s) received from a BS. In some instances, the random access configuration(s) may be for a plurality of frame based equipment (FBE) frames, each FBE frame having a transmission period and an idle period. In some instances, at least one RO of the plurality of ROs determined by the random access module 1708 at least partially overlaps with the idle period of at least one of the plurality of FBE frames. The random access module 1708 may be further configured to cause the UE 1700 to transmit the preamble in an uplink random access channel (e.g., PRACH) based on a SSB-to-RO mapping (e.g., as discussed above with respect to FIGS. 5A, 5B, 7, and/or 9). In this regard, the random access module 1708 may be configured to perform the SSB-to-RO mapping. The random access module 1708 may be further configured to communicate with the BS based on the PRACH, a communication signal in one or more component carriers of the set of component carriers. In some aspects, the random access module 1708 may be configured to determine two groups of ROs (e.g., as discussed above in relation to FIGS. 9A, 9B, and/or 11). In this regard, in some instances a first group of ROs includes ROs entirely within the transmission period of an FBE frame, while a second group of ROs includes ROs that at least partially overlap with the idle period of an FBE frame.

As shown, the transceiver 1710 may include the modem subsystem 1712 and the RF unit 1714. The transceiver 1710 can be configured to communicate bi-directionally with other devices, such as the BSs 105 and/or another core network element. The modem subsystem 1712 may be configured to modulate and/or encode data according to a MCS, e.g., a LDPC coding scheme, a turbo coding scheme, a convolutional coding scheme, a digital beamforming scheme, etc. The RF unit 1714 may be configured to process (e.g., perform analog to digital conversion or digital to analog conversion, etc.) modulated/encoded data (e.g., RRC configuration, PRACH configurations, PDCCH signals, SSB, PDSCH signals, UL data) from the modem subsystem 1712 (on outbound transmissions) or of transmissions originating from another source such as a BS 105. The RF unit 1714 may be further configured to perform analog beamforming in conjunction with the digital beamforming. Although shown as integrated together in transceiver 1710, the modem subsystem 1712 and/or the RF unit 1714 may be separate devices that are coupled together at the UE 115 to enable the UE 115 to communicate with other devices.

The RF unit 1714 may provide the modulated and/or processed data, e.g. data packets (or, more generally, data messages that may contain one or more data packets and other information), to the antennas 1716 for transmission to one or more other devices. This may include, for example, transmission of information to complete attachment to a network and communication with a BS 105 according to some aspects of the present disclosure. The antennas 1716 may further receive data messages transmitted from other devices and provide the received data messages for processing and/or demodulation at the transceiver 1710. The transceiver 1710 may provide the demodulated and decoded data (e.g., PUSCH signals, PUCCH signals, SSB, PRACH, BCH) to the random access channel module 1108 for processing. The antennas 1116 may include multiple antennas of similar or different designs in order to sustain multiple transmission links.

In some aspects, the transceiver 1710 is configured to communicate with other components of the UE 1700 to transmit, to a BS, a random access preamble from the set of the sequences available in the cell to initiate communication to a BS (e.g., BS, 105). The transceiver 1710 is further configured to communicate with other components of the UE 1700 to transmit, to the BS in the set of the sequences of preambles and synchronization signals, an uplink synchronization signal comprising PRACH, and communicate, with the BS based on the PRACH, a communication signal in one or more component carriers of the set of component carriers.

In an aspect, the UE 1700 can include multiple transceivers 1710 implementing different RATs (e.g., NR and LTE). In an aspect, the UE 1700 can include a single transceiver 1710 implementing multiple RATs (e.g., NR and LTE). In an aspect, the transceiver 1710 can include various components, where different combinations of components can implement different RATs.

Figure 18:
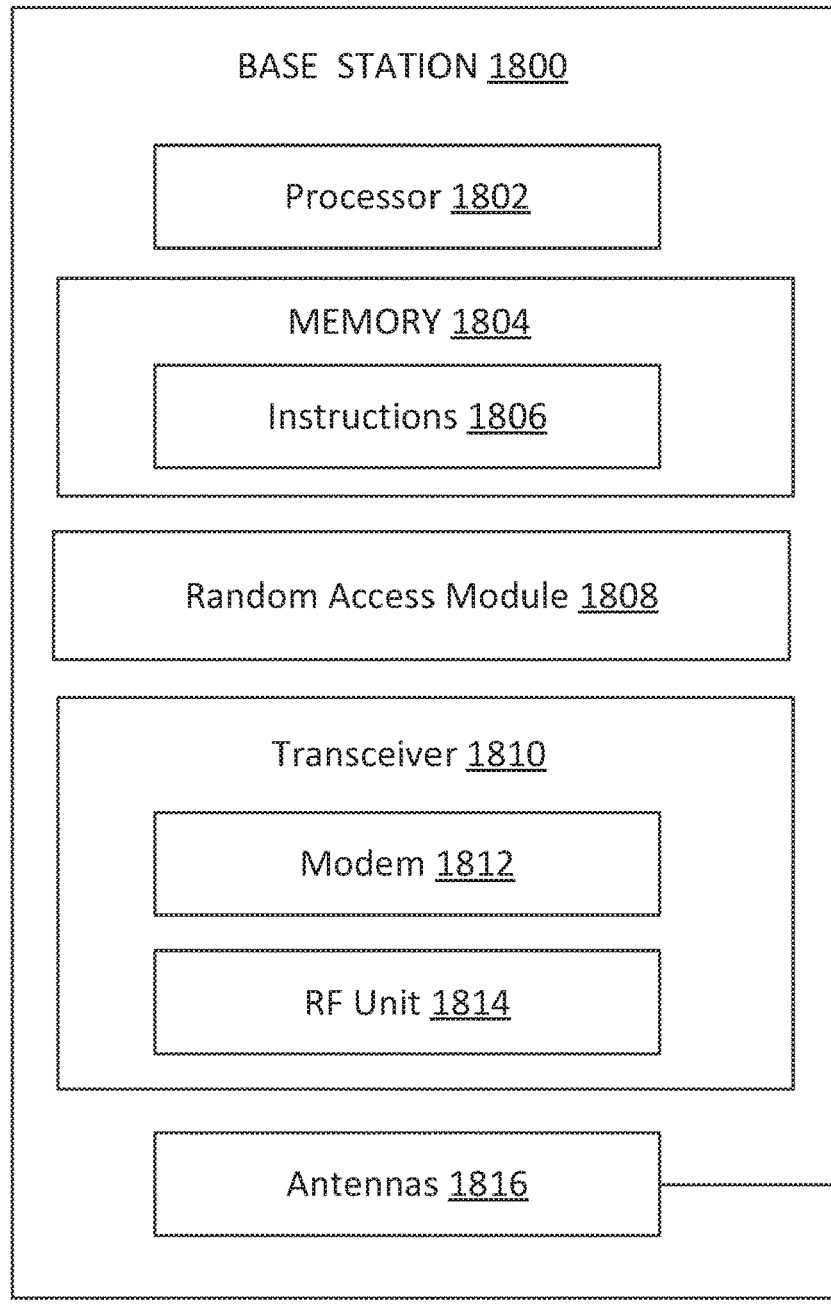
FIG. 18 is a block diagram of an exemplary base station (BS) according to some aspects of the present disclosure.

FIG. 18 is a block diagram of an exemplary BS 1800 according to some aspects of the present disclosure. The BS 1800 may be a BS 105 as discussed above with respect to FIG. 1. As shown, the BS 1800 may include a processor 1802, a memory 1804, a random access module 1808, a transceiver 1810 including a modem subsystem 1812 and a radio frequency (RF) unit 1814, and one or more antennas 1816. These elements may be in direct or indirect communication with each other, for example via one or more buses.

The processor 1802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1802 may also be implemented as a combination of computing devices, e.g., a combination of a DSP and a microprocessor, a plurality of microprocessors, one or more microprocessors in conjunction with a DSP core, or any other such configuration.

The memory 1804 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1804 includes a non-transitory computer-readable medium. The memory 1804 may store, or have recorded thereon, instructions 1806. The instructions 1806 may include instructions that, when executed by the processor 1802, cause the processor 1802 to perform the operations described herein with reference to the BSs 105 in connection with aspects of the present disclosure, for example, aspects of FIGS. 2-16B. Instructions 1806 may also be referred to as program code, which may be interpreted broadly to include any type of computer-readable statement(s) as discussed above with respect to FIG. 17.

The random access module 1808 may be implemented via hardware, software, or combinations thereof. For example, the random access module 1808 may be implemented as a processor, circuit, and/or instructions 1806 stored in the memory 1804 and executed by the processor 1802. In some instances, the random access module 1808 can be integrated within the modem subsystem 1812. For example, the random access module 1808 can be implemented by a combination of software components (e.g., executed by a DSP or a general processor) and hardware components (e.g., logic gates and circuitry) within the modem subsystem 1812.

The random access module 1808 may communicate various components of the BS 1800 to implement various aspects of the present disclosure, for example, aspects of FIGS. 2-16B. In some aspects, the random access module 1808 is configured to cause the BS 1800 to transmit, to a UE (e.g., the UEs 105), one or more PRACH configurations on a downlink BCH in an unlicensed radio frequency band. In this regard, the random access configuration(s) may be for a plurality of frame based equipment (FBE) frames, each FBE frame having a transmission period and an idle period. In some instances, the random access module 1808 may be configured to determine a plurality of ROs based on the random access configuration(s). In some instances, at least one RO of the plurality of ROs determined by the random access module 1808 at least partially overlaps with the idle period of at least one of the plurality of FBE frames. In some instances, the ROs are determined, at least in part, by an SSB-to-RO mapping (as discussed above with respect to FIGS. 5A, 5B, 7, and/or 9). In this regard, the random access module 1808 may be configured to perform the SSB-to-RO mapping. The random access module 1808 may be further configured to transmit, to the UE, ROs in SIB2. The random access module 1808 may be further configured to communicate, with the UE based on the PRACH, a communication signal in one or more component carriers of the set of component carriers. In some aspects, the random access module 1808 may be configured to configure ROs in two or more groups (e.g., as discussed above in relation to FIGS. 5A, 5B, 7, and/or 9). In this regard, in some instances a first group of ROs includes ROs entirely within the transmission period of an FBE frame, while a second group of ROs includes ROs that at least partially overlap with the idle period of an FBE frame. In some aspects, the random access module 1808 may be configured to broadcast two or more PRACH configurations associated with the different groups (e.g, as discussed above in relation to FIGS. 9A, 9B, and/or 11).

As shown, the transceiver 1810 may include the modem subsystem 1812 and the RF unit 1814. The transceiver 1810 can be configured to communicate bi-directionally with other devices, such as the UEs 115. The modem subsystem 1812 may be configured to modulate and/or encode the data from the memory 1804 and/or the random access module 1808 according to a modulation and coding scheme (MCS), e.g., a low-density parity check (LDPC) coding scheme, a turbo coding scheme, a convolutional coding scheme, a digital beamforming scheme, etc. The RF unit 1814 may be configured to process (e.g., perform analog to digital conversion or digital to analog conversion, etc.) modulated/encoded data (e.g., PUSCH signals, PUCCH signals) from the modem subsystem 1812 (on outbound transmissions) or of transmissions originating from another source such as a UE 115 or a BS 105. The RF unit 1814 may be further configured to perform analog beamforming in conjunction with the digital beamforming. Although shown as integrated together in transceiver 1810, the modem subsystem 1812 and the RF unit 1814 may be separate devices that are coupled together at the BS 105 to enable the UE 115 to communicate with other devices.

The RF unit 1814 may provide the modulated and/or processed data, e.g. data packets (or, more generally, data messages that may include one or more data packets and other information), to the antennas 1816 for transmission to one or more other devices. The antennas 1816 may further receive data messages transmitted from other devices. The antennas 1816 may provide the received data messages for processing and/or demodulation at the transceiver 1810. The transceiver 1810 may provide the demodulated and decoded data (e.g., RRC configuration, PRACH configurations, PDCCH signals, SIB, PDSCH signals, BCH Signals, DL data) to the random access module 1808 for processing. The antennas 1816 may include multiple antennas of similar or different designs in order to sustain multiple transmission links. The RF unit 1814 may configure the antennas 1816.

In some aspects, the transceiver 1810 is configured to communicate with other components of the BS 1800 to receive, from a UE, a PRACH preamble from a sequence of random preambles in the set of frequency interlaces being in a different component carrier of a set of component carriers. The transceiver 1810 is further configured to communicate with other components of the BS 1800 to receive, from the UE in the set of frequency interlaces, an uplink RACH signal comprising SSB, and communicate, with the UE based on the PRACH, a communication signal in one or more component carriers of the set of component carriers.

In an aspect, the BS 1800 can include multiple transceivers 1810 implementing different RATs (e.g., NR and LTE). In an aspect, the BS 1800 can include a single transceiver 1810 implementing multiple RATs (e.g., NR and LTE). In an aspect, the transceiver 1810 can include various components, where different combinations of components can implement different RATs.

Figure 19:
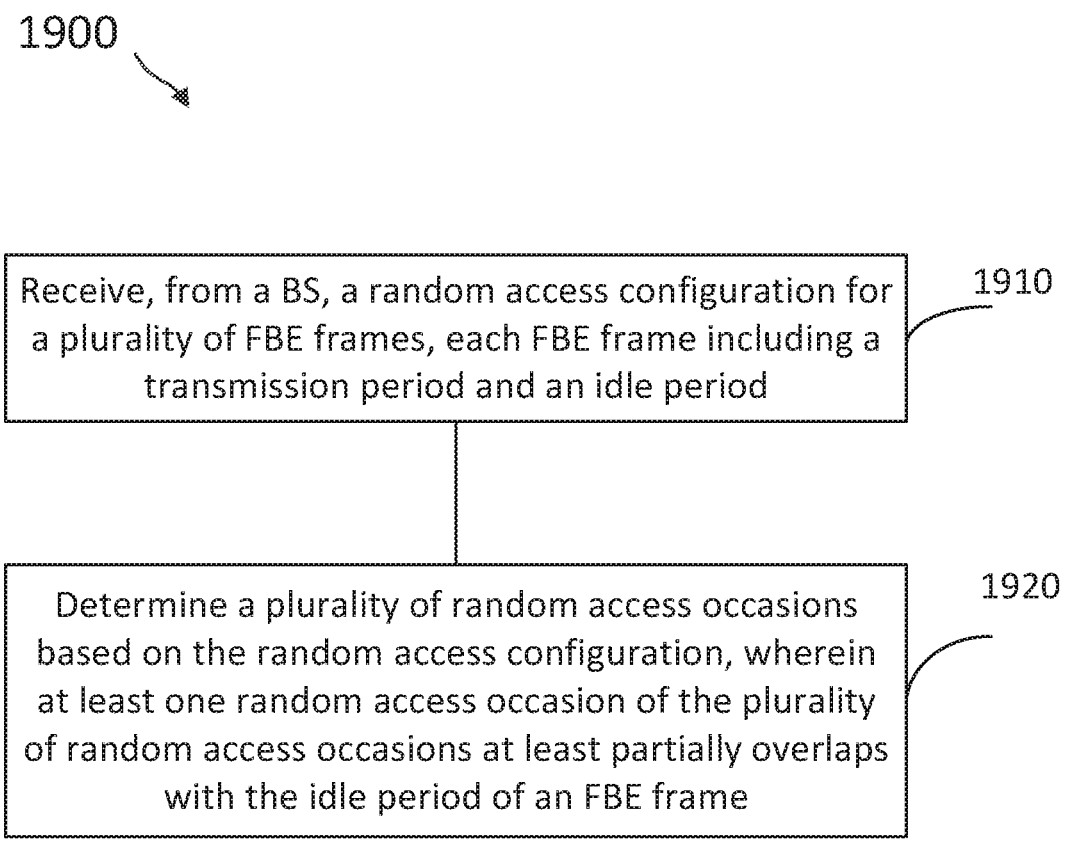
FIG. 19 is a flow diagram of a wireless communication method according to some aspects of the present disclosure.

FIG. 19 is a flow diagram of a wireless communication method 1900 according to some aspects of the present disclosure. Aspects of the method 1900 can be executed by a computing device (e.g., a processor, processing circuit, and/or other suitable component) of a wireless communication device or other suitable means for performing the steps. For example, a wireless communication device, such as a UE 115 or the UE 1700, may utilize one or more components, such as the processor 1702, the memory 1704, the random access module 1708, the transceiver 1710, the modem 1712, and the one or more antennas 1716, to execute the steps of method 1900. The method 1900 may employ similar mechanisms as described above in FIGS. 2-16B. As illustrated, the method 1900 includes a number of enumerated steps, but aspects of the method 1900 may include additional steps before, after, and in between the enumerated steps. In some aspects, one or more of the enumerated steps may be omitted or performed in a different order.

At block 1910, the UE receives, from a BS, one or more random access configurations for a plurality of FBE frames, each FBE frame of the plurality of FBE frames including a transmission period and an idle period. The FBE frames may be similar to the FFPs 301 of FIG. 3. In some aspects, the UE may receive random access configurations in two or more groups (e.g., as described above with respect to FIGS. 5A, 5B). In some aspects, the UE may receive two or more PRACH configurations (e.g., as described above with respect to FIG. 11). For instance, a first PRACH configuration may be similar to the PRACH configurations described above with respect to FIGS. 8 and 9A (where valid ROs are within transmission periods of FFPs) and a second PRACH configuration may be similar to the PRACH configuration described above with respect to FIGS. 8 and 9B (where valid ROs are at least partially overlapping with idle periods of FFPs). In some other instances, the second PRACH configuration may be specifically configured to utilize idle periods of FFPs as described above with respect to FIGS. 10, 12, 14A-14B, 15A-15B, and 16A-16B.

At block 1920, the UE determines a plurality of ROs based on the random access configuration(s) received at block 1910. In some instances, at least one RO of the plurality of ROs at least partially overlaps with the idle period of at least one of the plurality of FBE frames. In some aspects, the UE may receive ROs where the ROs are outside of the idle period of the FBE frame (i.e., entirely within the transmission period of the FBE frame). In some other aspects, the UE may receive ROs where the ROs are partially or fully overlapped with the idle period of the FBE frame (i.e., at least a portion of the RO is outside of the transmission period of the FBE frame).

In some instances, the UE determines the plurality of ROs by determining first and second groups of ROs from the plurality of ROs. In some aspects, each RO in the first group of ROs is within the transmission period of one of the plurality of FBE frames, while each RO in the second group is at least partially overlapping with the idle period of at least one of the plurality of FBE frames.

In some instances of the method 1900, the UE performs a synchronization signal block (SSB)-to-RO mapping procedure. The SSB-to-RO mapping procedure can include the UE mapping a set of synchronization signal blocks (SSBs) to the ROs in a first group of ROs based on a mapping order and mapping the set of SSBs to the ROs in a second group of ROs based on the mapping order. In this regard, in some aspects the UE performs the SSB-to-random access occasion mapping procedure by mapping the set of SSBs to the ROs in the first and second groups based on a common association period. In some instances, the UE determines the common association period based on at least one of a number of random access occasions of the first group in a random access configuration period, a number of SSBs in the set of SSBs, or a set of allowable association periods. In some instances, the UE may determine a first association period based on at least one of a number of ROs of the first group in a random access configuration period, a number of SSBs in the set of SSBs, or a set of allowable association periods; determine a second association period based on at least one of a number of ROs of the second group in the random access configuration period, the number of SSBs in the set of SSBs, or a set of allowable association periods; and determine the common association period based on a maximum period between the first association period and the second association period.

In some instances, the UE determines a first association period based on at least one of a number of random access occasions of the first group in a random access configuration period, a number of SSBs in the set of SSBs, or a set of allowable association periods and maps the set of SSBs to the random access occasions in the first group based on the first association period. The UE may also determine a second association period based on at least one of a number of random access occasions of the second group in the random access configuration period, the number of SSBs in the set of SSBs, or the set of allowable association periods and map the set of SSBs to the random access occasions in the second group based on the second association period.

In some instances, the UE receives, from the BS, a first random access configuration indicating a first set of random access occasions in the plurality of FBE frames. The UE may also receive, from the BS, a second random access configuration indicating a second set of random access occasions in the plurality of FBE frames. In some aspects, the UE determines, based on the first random access configuration, a first subset of the plurality of random access occasions by excluding any random access occasion in the first set of random access occasions that is not fully within the transmission period of the plurality of FBE frames. In some aspects, the UE determines, based on the second random access configuration, a second subset of the plurality of random access occasions by excluding any random access occasion in the second set of random access occasions that is fully within the transmission period of the plurality of FBE frames. In some instances, the first set of random access occasions is based on a first random access occasion pattern and the second set of random access occasions is based on a second random access occasion pattern different from the first random access occasion pattern. In some instances, the first set of random access occasions and the second set of random access occasions are based on the same random access occasion pattern.

In some instances, the UE receives, from the BS, a first random access configuration indicating a first set of random access occasions in the plurality of FBE frames. The UE may also receive a second random access configuration indicating a second set of random access occasions in the plurality of FBE frames, wherein each random access occasion of the second set of random access occasions is at least partially overlapping with the idle period of the plurality of FBE frames. In some instances, the UE determines, based on the first random access configuration, a first subset of the plurality of random access occasions by excluding any random access occasion in the first set of random access occasions that is not fully within the transmission period of the plurality of FBE frames. In some aspects, the UE determines, based on the second random access configuration, a second subset of the plurality of random access occasions by including all of the second set of random access occasions. In some instances, the second random access configuration indicates at least one of a set of subframes for the second set of random access occasions, a random access slot within a random access subframe for the second set of random access occasions, a starting symbol for the second set of random access occasions, or a number of random access occasions in the random access slot. In some instances, the set of subframes include the idle period of a first FBE frame of the plurality of FBE frames. In some instances, the second random access configuration indicates the random access slot within the random access subframe, and wherein the random access slot is a last slot within the random access subframe. In some instances, the second random access configuration indicates the starting symbol, wherein the starting symbol is within a first FBE frame of the plurality of FBE frames and outside of the idle period of the first FBE frame. In some instances, the second random access configuration indicates the starting symbol, wherein the starting symbol is within the idle period of a first FBE frame of the plurality of FBE frames. In some instances, the second random access configuration indicates the starting symbol, wherein the starting symbol is within the idle period of a first FBE frame of the plurality of FBE frames and offset from an earliest symbol of the idle period of the first FBE frame. In some instances, the second random access configuration further indicates the number of random access occasions, wherein a latest random access occasion of the second set of random access occasions is fully within the idle period of a first FBE frame of the plurality of FBE frames and offset from a last symbol of the idle period of the first FBE frame.

In some instances, the UE performs the SSB-to-RO mapping procedure by mapping a set of synchronization signal blocks (SSBs) to the first subset of the plurality of random access occasions based on a mapping order and mapping the set of SSBs to the second subset of the plurality of random access occasions based on the mapping order. In some aspects, the UE may map the set of SSBs to the first subset of the plurality of random access occasions based on a common association period. The UE may also map the set of SSBs to the second subset of the plurality of random access occasions based on the common association period. In some instances, the UE may determine the common association period based on at least one of a number of random access occasions of the first subset of the plurality of random access occasions in a random access configuration period, a number of SSBs in the set of SSBs, or a set of allowable association periods. In some instances, the UE may determine a first association period based on at least one of a number of random access occasions of the first subset of the plurality of random access occasions in a random access configuration period, a number of SSBs in the set of SSBs, or a set of allowable association periods; determine a second association period based on at least one of a number of random access occasions of the second subset of the plurality of random access occasions in the random access configuration period, the number of SSBs in the set of SSBs, or the set of allowable association periods; and determine the common association period based on a maximum period between the first association period and the second association period.

In some instances, the UE determines a first association period based on at least one of a number of random access occasions of the first subset of the plurality of random access occasions in a random access configuration period, a number of SSBs in the set of SSBs, or a set of allowable association periods and maps the set of SSBs to the first subset of the plurality of random access occasions based on the first association period. In some instances, the UE determines a second association period based on at least one of a number of random access occasions of the second subset of the plurality of random access occasions in the random access configuration period, the number of SSBs in the set of SSBs, or the set of allowable association periods and maps the set of SSBs to the second subset of the plurality of random access occasions based on the second association period.

FIG. 20 is a flow diagram of a wireless communication method 2000 according to some aspects of the present disclosure. Aspects of the method 2000 can be executed by a computing device (e.g., a processor, processing circuit, and/or other suitable component) of a wireless communication device or other suitable means for performing the steps. For example, a wireless communication device, such as a BS 105 or the BS 1800, may utilize one or more components, such as the processor 1802, the memory 1804, the random access module 1808, the transceiver 1810, the modem 1812, and the one or more antennas 1816, to execute the steps of method 2000. The method 2000 may employ similar mechanisms as described above in FIGS. 2-16B. As illustrated, the method 2000 includes a number of enumerated steps, but aspects of the method 2000 may include additional steps before, after, and in between the enumerated steps. In some aspects, one or more of the enumerated steps may be omitted or performed in a different order.

At block 2010, the BS transmits to a UE one or more random access configurations for a plurality of FBE frames, each FBE frame of the plurality of FBE frames including a transmission period and an idle period. In some aspects the BS may transmit random access configurations in two or more groups (e.g., as described above with respect to FIGS. 5A, 5B). In some aspects, the BS may transmit two or more PRACH configurations (e.g., as described above with respect to FIG. 11).

At block 2020, the BS determines a plurality of ROs based on the random access configuration(s) transmitted at block 1910. In some instances, at least one RO of the plurality of ROs at least partially overlaps with the idle period of at least one of the plurality of FBE frames. In some aspects, the random access configuration(s) transmitted by the BS may indicate that the ROs are outside of the idle period of the FBE frame (i.e., entirely within the transmission period of the FBE frame). In some other aspects, the random access configuration(s) transmitted by the BS may indicate that the ROs are partially or fully overlapped with the idle period of the FBE frame (i.e., at least a portion of the RO is outside of the transmission period of the FBE frame).

In some instances, the BS determines the plurality of ROs by determining first and second groups of ROs from the plurality of ROs. In some aspects, each RO in the first group of ROs is within the transmission period of one of the plurality of FBE frames, while each RO in the second group is at least partially overlapping with the idle period of at least one of the plurality of FBE frames.

In some instances of the method 2000, the BS performs a synchronization signal block (SSB)-to-RO mapping procedure. The SSB-to-RO mapping procedure can include the BS mapping a set of synchronization signal blocks (SSBs) to the ROs in a first group of ROs based on a mapping order and mapping the set of SSBs to the ROs in a second group of ROs based on the mapping order. In this regard, the BS may perform the SSB-to-random access occasion mapping procedure by mapping the set of SSBs to the ROs in the first and second groups based on a common association period. In some instances, the BS determines the common association period based on at least one of a number of random access occasions of the first group in a random access configuration period, a number of SSBs in the set of SSBs, or a set of allowable association periods. In some instances, the BS may determine a first association period based on at least one of a number of ROs of the first group in a random access configuration period, a number of SSBs in the set of SSBs, or a set of allowable association periods; determine a second association period based on at least one of a number of ROs of the second group in the random access configuration period, the number of SSBs in the set of SSBs, or the set of allowable association periods; and determine the common association period based on a maximum period between the first association period and the second association period.

In some instances, the BS determines a first association period based on at least one of a number of random access occasions of the first group in a random access configuration period, a number of SSBs in the set of SSBs, or a set of allowable association periods and maps the set of SSBs to the random access occasions in the first group based on the first association period. The BS may also determine a second association period based on at least one of a number of random access occasions of the second group in the random access configuration period, the number of SSBs in the set of SSBs, or the set of allowable association periods and map the set of SSBs to the random access occasions in the second group based on the second association period.

In some instances, the BS transmits to the UE a first random access configuration indicating a first set of random access occasions in the plurality of FBE frames. The BS may also transmit to the UE a second random access configuration indicating a second set of random access occasions in the plurality of FBE frames. In some aspects, the BS determines, based on the first random access configuration, a first subset of the plurality of random access occasions by excluding any random access occasion in the first set of random access occasions that is not fully within the transmission period of the plurality of FBE frames. In some aspects, the BS determines, based on the second random access configuration, a second subset of the plurality of random access occasions by excluding any random access occasion in the second set of random access occasions that is fully within the transmission period of the plurality of FBE frames. In some instances, the first set of random access occasions is based on a first random access occasion pattern and the second set of random access occasions is based on a second random access occasion pattern different from the first random access occasion pattern. In some instances, the first set of random access occasions and the second set of random access occasions are based on the same random access occasion pattern.

In some instances, the BS transmits to the UE a first random access configuration indicating a first set of random access occasions in the plurality of FBE frames. The BS may also transmit to the UE a second random access configuration indicating a second set of random access occasions in the plurality of FBE frames, wherein each random access occasion of the second set of random access occasions is at least partially overlapping with the idle period of the plurality of FBE frames. In some instances, the BS determines, based on the first random access configuration, a first subset of the plurality of random access occasions by excluding any random access occasion in the first set of random access occasions that is not fully within the transmission period of the plurality of FBE frames. In some aspects, the BS determines, based on the second random access configuration, a second subset of the plurality of random access occasions by including all of the second set of random access occasions. In some instances, the second random access configuration indicates at least one of a set of subframes for the second set of random access occasions, a random access slot within a random access subframe for the second set of random access occasions, a starting symbol for the second set of random access occasions, or a number of random access occasions in the random access slot. In some instances, the set of subframes include the idle period of a first FBE frame of the plurality of FBE frames. In some instances, the second random access configuration indicates the random access slot within the random access subframe, and wherein the random access slot is a last slot within the random access subframe. In some instances, the second random access configuration indicates the starting symbol, wherein the starting symbol is within a first FBE frame of the plurality of FBE frames and outside of the idle period of the first FBE frame. In some instances, the second random access configuration indicates the starting symbol, wherein the starting symbol is within the idle period of a first FBE frame of the plurality of FBE frames. In some instances, the second random access configuration indicates the starting symbol, wherein the starting symbol is within the idle period of a first FBE frame of the plurality of FBE frames and offset from an earliest symbol of the idle period of the first FBE frame. In some instances, the second random access configuration further indicates the number of random access occasions, wherein a latest random access occasion of the second set of random access occasions is fully within the idle period of a first FBE frame of the plurality of FBE frames and offset from a last symbol of the idle period of the first FBE frame.

In some instances, the BS performs the SSB-to-RO mapping procedure by mapping a set of synchronization signal blocks (SSBs) to the first subset of the plurality of random access occasions based on a mapping order and mapping the set of SSBs to the second subset of the plurality of random access occasions based on the mapping order. In some aspects, the BS may map the set of SSBs to the first subset of the plurality of random access occasions based on a common association period. The BS may also map the set of SSBs to the second subset of the plurality of random access occasions based on the common association period. In some instances, the BS may determine the common association period based on at least one of a number of random access occasions of the first subset of the plurality of random access occasions in a random access configuration period, a number of SSBs in the set of SSBs, or a set of allowable association periods. In some instances, the BS may determine a first association period based on at least one of a number of random access occasions of the first subset of the plurality of random access occasions in a random access configuration period, a number of SSBs in the set of SSBs, or a set of allowable association periods; determine a second association period based on at least one of a number of random access occasions of the second subset of the plurality of random access occasions in the random access configuration period, the number of SSBs in the set of SSBs, or the set of allowable association periods; and determine the common association period based on a maximum period between the first association period and the second association period.

In some instances, the BS determines a first association period based on at least one of a number of random access occasions of the first subset of the plurality of random access occasions in a random access configuration period, a number of SSBs in the set of SSBs, or a set of allowable association periods and maps the set of SSBs to the first subset of the plurality of random access occasions based on the first association period. In some instances, the BS determines a second association period based on at least one of a number of random access occasions of the second subset of the plurality of random access occasions in the random access configuration period, the number of SSBs in the set of SSBs, or the set of allowable association periods and maps the set of SSBs to the second subset of the plurality of random access occasions based on the second association period.

In some aspects, a first wireless communication device communicates, with a second wireless communication device, a random access configuration for a plurality of frame based equipment (FBE) frames, each FBE frame of the plurality of FBE frames including a transmission period and an idle period. The first wireless communication device determines a plurality of random access occasions based on the random access configuration, wherein at least one random access occasion of the plurality of random access occasions is at least partially overlapping with the idle period of at least one of the plurality of FBE frames. In some aspects, the first wireless communication device corresponds to a UE (e.g., UE 115) and the second wireless communication device corresponds to a BS (e.g., BS 105). The first wireless communication device may implement the method 1900 discussed above with respect to FIG. 19. In some aspects, the first wireless communication device corresponds to a BS (e.g., BS 105) and the second wireless communication device corresponds to a UE (e.g., UE 115). The first wireless communication device may implement the method 2000 discussed above with respect to FIG. 20.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

APPENDIX

| PRACH preamble | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|
| PRACH occasions in a PRACH slot for 5 ms FFP and 15 kHz SCS ||||||
| A1 | 10 | 1 | 1 | 2 |
| A1 | 9 | 1 | 2 | 2 |
| A2 | 8 | 1 | 1 | 4 |
| A2 | 9 | 1 | 1 | 4 |
| A3 | 6 | 1 | 1 | 6 |
| A3 | 7 | 1 | 1 | 6 |
| B1 | 10 | 1 | 2 | 2 |
| B4 | 6 | 1 | 1 | 6 |
| B4 | 8 | 1 | 1 | 6 |
| C0 | 10 | 1 | 2 | 2 |
| C2 | 8 | 1 | 1 | 6 |
| A1/B1 | 10 | 1 | 2 | 2 |
| A2/B2 | 8 | 1 | 1 | 4 |
| A2/B2 | 10 | 1 | 1 | 4 |
| A3/B3 | 6 | 1 | 1 | 6 |
| A3/B3 | 8 | 1 | 1 | 6 |
| PRACH occasions in a PRACH slot for 4 ms FFP and 15 kHz SCS ||||||
| A1 | 10 | 1 | 1 | 2 |
| A1 | 11 | 1 | 1 | 2 |
| A2 | 8 | 1 | 1 | 4 |
| A2 | 9 | 1 | 1 | 4 |
| A3 | 6 | 1 | 1 | 6 |
| A3 | 7 | 1 | 1 | 6 |
| B1 | 10 | 1 | 2 | 2 |
| B4 | 6 | 1 | 1 | 6 |
| C0 | 10 | 1 | 2 | 2 |
| C2 | 8 | 1 | 1 | 6 |
| A1/B1 | 10 | 1 | 2 | 2 |
| A2/B2 | 8 | 1 | 1 | 4 |
| A2/B2 | 10 | 1 | 1 | 4 |
| A3/B3 | 6 | 1 | 1 | 6 |
| A3/B3 | 8 | 1 | 1 | 6 |
| PRACH occasions in a PRACH slot for 2.5 ms, 2 ms or 1 ms FFP and 15 kHz SCS ||||||
| A1 | 11 | 1 | 1 | 2 |
| A2 | 9 | 1 | 1 | 4 |
| A3 | 7 | 1 | 1 | 6 |
| B1 | 12 | 1 | 1 | 2 |
| B4 | 8 | 1 | 1 | 6 |
| C0 | 12 | 1 | 1 | 2 |
| C2 | 8 | 1 | 1 | 6 |
| A1/B1 | 12 | 1 | 1 | 2 |
| A2/B2 | 10 | 1 | 1 | 4 |
| A3/B3 | 8 | 1 | 1 | 6 |
| PRACH occasions in a PRACH slot for 10 ms FFP and 30 kHz SCS ||||||
| A1 | 0 | 1 | 6 | 2 |
| A1 | 7 | 1 | 3 | 2 |
| A2 | 0 | 1 | 3 | 4 |
| A2 | 9 | 1 | 1 | 4 |
| A3 | 0 | 1 | 2 | 6 |
| A3 | 7 | 1 | 1 | 6 |
| B1 | 2 | 1 | 6 | 2 |
| B1 | 8 | 1 | 3 | 2 |
| B4 | 0 | 1 | 2 | 6 |
| B4 | 2 | 1 | 2 | 6 |
| C0 | 2 | 1 | 6 | 2 |

APPENDIX-continued

| PRACH preamble | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|
| C0 | 8 | 1 | 3 | 2 |
| C2 | 2 | 1 | 2 | 6 |
| C2 | 8 | 1 | 1 | 6 |
| A1/B1 | 2 | 1 | 6 | 2 |
| A1/B1 | 8 | 1 | 3 | 2 |
| A2/B2 | 0 | 1 | 3 | 4 |
| A2/B2 | 6 | 1 | 2 | 4 |
| A3/B3 | 0 | 1 | 2 | 6 |
| A3/B3 | 2 | 1 | 2 | 6 |
| PRACH occasions in a PRACH slot for 5 ms FFP and 30 kHz SCS | | | | |
| A1 | 6 | 1 | 3 | 2 |
| A1 | 7 | 1 | 3 | 2 |
| A2 | 4 | 1 | 2 | 4 |
| A2 | 9 | 1 | 1 | 4 |
| A3 | 6 | 1 | 1 | 6 |
| A3 | 7 | 1 | 1 | 6 |
| B1 | 6 | 1 | 4 | 2 |
| B1 | 8 | 1 | 3 | 2 |
| B4 | 6 | 1 | 1 | 6 |
| B4 | 2 | 1 | 2 | 6 |
| C0 | 8 | 1 | 3 | 2 |
| C0 | 6 | 1 | 4 | 2 |
| C2 | 2 | 1 | 2 | 2 |
| C2 | 8 | 1 | 1 | 8 |
| A1/B1 | 6 | 1 | 4 | 2 |
| A1/B1 | 8 | 1 | 3 | 2 |
| A2/B2 | 4 | 1 | 2 | 4 |
| A2/B2 | 6 | 1 | 2 | 4 |
| A3/B3 | 6 | 1 | 1 | 6 |
| A3/B3 | 2 | 1 | 2 | 6 |
| PRACH occasions in a PRACH slot for 4 ms FFP and 30 kHz SCS | | | | |
| A1 | 8 | 1 | 2 | 2 |
| A1 | 9 | 1 | 2 | 2 |
| A2 | 8 | 1 | 1 | 4 |
| A2 | 9 | 1 | 1 | 4 |
| A3 | 6 | 1 | 1 | 6 |
| A3 | 7 | 1 | 1 | 6 |
| B1 | 8 | 1 | 3 | 2 |
| B4 | 6 | 1 | 1 | 6 |
| C0 | 8 | 1 | 3 | 2 |
| C2 | 8 | 1 | 1 | 6 |
| A1/B1 | 8 | 1 | 3 | 2 |
| A2/B2 | 8 | 1 | 1 | 4 |
| A2/B2 | 6 | 1 | 2 | 4 |
| A3/B3 | 6 | 1 | 1 | 6 |
| A3/B3 | 8 | 1 | 1 | 6 |
| PRACH occasions in a PRACH slot for 2.5 ms FFP and 30 kHz SCS | | | | |
| A1 | 10 | 1 | 1 | 2 |
| A1 | 9 | 1 | 2 | 2 |
| A2 | 8 | 1 | 1 | 4 |
| A2 | 9 | 1 | 1 | 4 |
| A3 | 6 | 1 | 1 | 6 |
| A3 | 7 | 1 | 1 | 6 |
| B1 | 10 | 1 | 2 | 2 |
| B4 | 6 | 1 | 1 | 6 |
| B4 | 8 | 1 | 1 | 6 |
| C0 | 10 | 1 | 2 | 2 |
| C2 | 8 | 1 | 1 | 6 |
| A1/B1 | 10 | 1 | 2 | 2 |
| A2/B2 | 8 | 1 | 1 | 4 |
| A2/B2 | 10 | 1 | 1 | 4 |
| A3/B3 | 6 | 1 | 1 | 6 |
| A3/B3 | 8 | 1 | 1 | 6 |
| PRACH occasions in a PRACH slot for 2 ms or 1 ms FFP and 30 kHz SCS | | | | |
| A1 | 10 | 1 | 1 | 2 |
| A1 | 11 | 1 | 1 | 2 |
| A2 | 8 | 1 | 1 | 4 |
| A2 | 9 | 1 | 1 | 4 |
| A3 | 6 | 1 | 1 | 6 |
| A3 | 7 | 1 | 1 | 6 |
| B1 | 10 | 1 | 2 | 2 |
| B4 | 6 | 1 | 1 | 6 |
| C0 | 10 | 1 | 2 | 2 |
| C2 | 8 | 1 | 1 | 6 |
| A1/B1 | 10 | 1 | 2 | 2 |
| A2/B2 | 8 | 1 | 1 | 4 |
| A2/B2 | 10 | 1 | 1 | 4 |
| A3/B3 | 6 | 1 | 1 | 6 |
| A3/B3 | 8 | 1 | 1 | 6 |
| PRACH occasions in a PRACH slot for 10 ms FFP and 15 kHz SCS | | | | |
| A1 | 8 | 1 | 2 | 2 |
| A2 | 8 | 1 | 1 | 4 |
| B1 | 8 | 1 | 3 | 2 |
| B4 | 8 | 1 | 1 | 6 |
| C0 | 8 | 1 | 3 | 2 |
| C2 | 8 | 1 | 1 | 6 |
| A1/B1 | 8 | 1 | 3 | 2 |
| PRACH occasions in a PRACH slot for 5 ms FFP and 15 kHz SCS | | | | |
| A1 | 11 | 1 | 1 | 2 |
| B1 | 11 | 1 | 1 | 2 |
| C0 | 11 | 1 | 1 | 2 |
| PRACH occasions in a PRACH slot for 4 ms FFP and 15 kHz SCS | | | | |
| B1 | 12 | 1 | 1 | 2 |
| C0 | 12 | 1 | 1 | 2 |
| PRACH occasions in a PRACH slot for 10 ms FFP and 30 kHz SCS | | | | |
| A1 | 1 | 1 | 6 | 2 |
| A2 | 1 | 1 | 3 | 4 |
| A3 | 1 | 1 | 2 | 6 |
| B1 | 1 | 1 | 6 | 2 |
| B4 | 1 | 1 | 2 | 6 |
| C0 | 1 | 1 | 6 | 2 |
| C2 | 1 | 1 | 2 | 6 |
| A1/B1 | 1 | 1 | 6 | 2 |
| A2/B2 | 1 | 1 | 3 | 4 |
| A3/B3 | 1 | 1 | 2 | 6 |
| PRACH occasions in a PRACH slot for 5 ms FFP and 30 kHz SCS | | | | |
| A1 | 8 | 1 | 2 | 2 |
| A2 | 8 | 1 | 1 | 4 |
| B1 | 8 | 1 | 3 | 2 |
| B4 | 8 | 1 | 1 | 6 |
| C0 | 8 | 1 | 3 | 2 |
| C2 | 8 | 1 | 1 | 6 |
| A1/B1 | 8 | 1 | 3 | 2 |
| PRACH occasions in a PRACH slot for 4 ms FFP and 30 kHz SCS | | | | |
| A1 | 9 | 1 | 2 | 2 |
| A2 | 9 | 1 | 1 | 4 |
| B1 | 9 | 1 | 2 | 2 |
| C0 | 9 | 1 | 2 | 2 |
| A1/B1 | 9 | 1 | 2 | 2 |
| PRACH occasions in a PRACH slot for 2.5 ms FFP and 30 kHz SCS | | | | |
| A1 | 11 | 1 | 1 | 2 |
| B1 | 11 | 1 | 1 | 2 |
| C0 | 11 | 1 | 1 | 2 |
| PRACH occasions in a PRACH slot for 2 ms or 1 ms FFP and 30 kHz SCS | | | | |
| B1 | 12 | 1 | 1 | 2 |
| C0 | 12 | 1 | 1 | 2 |

What is claimed is:

1. A method of wireless communication performed by a first wireless communication device, the method comprising:

communicating, with a second wireless communication device, a random access configuration for a plurality of frame based equipment (FBE) frames, each FBE frame of the plurality of FBE frames including a transmission period and an idle period; and determining a plurality of random access occasions based on the random access configuration, wherein at least one random access occasion of the plurality of random access occasions is at least partially overlapping with the idle period of at least one of the plurality of FBE frames.

2. The method of claim 1, wherein the determining comprises:

determining a first group of random access occasions from the plurality of random access occasions, wherein each random access occasion in the first group is within the transmission period of one of the plurality of FBE frames; and determining a second group of random access occasions from the plurality of random access occasions, wherein each random access occasion in the second group is at least partially overlapping with the idle period of at least one of the plurality of FBE frames; and wherein the method further comprises:

performing a synchronization signal block (SSB)-to-random access occasion mapping procedure, wherein the performing the SSB-to-random access occasion mapping procedure comprises:

mapping a set of synchronization signal blocks (SSBs) to the random access occasions in the first group based on a mapping order; and mapping the set of SSBs to the random access occasions in the second group based on the mapping order.

3. The method of claim 2, wherein the performing the SSB-to-random access occasion mapping procedure further comprises:

mapping the set of SSBs to the random access occasions in the first group based on a common association period;

mapping the set of SSBs to the random access occasions in the second group based on the common association period; and determining the common association period based on at least one of a number of random access occasions of the first group in a random access configuration period, a number of SSBs in the set of SSBs, or a set of allowable association periods.

4. The method of claim 2, wherein the performing the SSB-to-random access occasion mapping procedure further comprises:

mapping the set of SSBs to the random access occasions in the first group based on a common association period;

mapping the set of SSBs to the random access occasions in the second group based on the common association period;

determining a first association period based on at least one of a number of random access occasions of the first group in a random access configuration period, a number of SSBs in the set of SSBs, or a set of allowable association periods;

determining a second association period based on at least one of a number of random access occasions of the second group in the random access configuration period, the number of SSBs in the set of SSBs, or the set of allowable association periods; and determining the common association period based on a maximum period between the first association period and the second association period.

5. The method of claim 2, wherein the performing the SSB-to-random access occasion mapping procedure further comprises:

determining a first association period based on at least one of a number of random access occasions of the first group in a random access configuration period, a number of SSBs in the set of SSBs, or a set of allowable association periods;

mapping the set of SSBs to the random access occasions in the first group based on the first association period;

determining a second association period based on at least one of a number of random access occasions of the second group in the random access configuration period, the number of SSBs in the set of SSBs, or the set of allowable association periods; and mapping the set of SSBs to the random access occasions in the second group based on the second association period.

6. The method of claim 1, wherein:

the communicating the random access configuration comprises:

communicating, with the second wireless communication device, a first random access configuration indicating a first set of random access occasions in the plurality of FBE frames; and communicating, with the second wireless communication device, a second random access configuration indicating a second set of random access occasions in the plurality of FBE frames; and the determining comprises:

determining, based on the first random access configuration, a first subset of the plurality of random access occasions by excluding any random access occasion in the first set of random access occasions that is not fully within the transmission period of the plurality of FBE frames; and determining, based on the second random access configuration, a second subset of the plurality of random access occasions by excluding any random access occasion in the second set of random access occasions that is fully within the transmission period of the plurality of FBE frames.

7. The method of claim 1, wherein:

the communicating the random access configuration comprises:

communicating, with the second wireless communication device, a first random access configuration indicating a first set of random access occasions in the plurality of FBE frames; and communicating, with the second wireless communication device, a second random access configuration indicating a second set of random access occasions in the plurality of FBE frames, wherein each random access occasion of the second set of random access occasions is at least partially overlapping with the idle period of the plurality of FBE frames; and the determining comprises:

determining, based on the first random access configuration, a first subset of the plurality of random access occasions by excluding any random access occasion in the first set of random access occasions that is not fully within the transmission period of the plurality of FBE frames; and determining, based on the second random access configuration, a second subset of the plurality of random access occasions by including all of the second set of random access occasions.

8. The method of claim 7, wherein the second random access configuration indicates at least one of a set of subframes for the second set of random access occasions, a random access slot within a random access subframe for the second set of random access occasions, a starting symbol for the second set of random access occasions, or a number of random access occasions in the random access slot,
wherein the set of subframes include the idle period of a first FBE frame of the plurality of FBE frames,
wherein the second random access configuration indicates the random access slot within the random access subframe, and wherein the random access slot is a last slot within the random access subframe, and
wherein the second random access configuration indicates the starting symbol, and wherein the starting symbol is one of:
within a first FBE frame of the plurality of FBE frames and outside of the idle period of the first FBE frame;
within the idle period of a first FBE frame of the plurality of FBE frames; or
within the idle period of a first FBE frame of the plurality of FBE frames and offset from an earliest symbol of the idle period of the first FBE frame.

9. The method of claim 7, wherein the second random access configuration indicates at least one of a set of subframes for the second set of random access occasions, a random access slot within a random access subframe for the second set of random access occasions, a starting symbol for the second set of random access occasions, or a number of random access occasions in the random access slot,
wherein the set of subframes include the idle period of a first FBE frame of the plurality of FBE frames,
wherein the second random access configuration indicates the random access slot within the random access subframe, and wherein the random access slot is a last slot within the random access subframe,
wherein the second random access configuration further indicates the number of random access occasions, and
wherein a latest random access occasion of the second set of random access occasions is fully within the idle period of a first FBE frame of the plurality of FBE frames and offset from a last symbol of the idle period of the first FBE frame.

10. The method of any of claim 6 or 7, further comprising:
performing a synchronization signal block (SSB)-to-random access occasion mapping procedure, wherein the performing the SSB-to-random access occasion mapping procedure comprises:
mapping a set of synchronization signal blocks (SSBs) to the first subset of the plurality of random access occasions based on a mapping order;
mapping the set of SSBs to the second subset of the plurality of random access occasions based on the mapping order;
mapping the set of SSBs to the first subset of the plurality of random access occasions based on a common association period; and
mapping the set of SSBs to the second subset of the plurality of random access occasions based on the common association period.

11. The method of claim 10, wherein the performing the SSB-to-random access occasion mapping procedure further comprises:

determining the common association period based on at least one of a number of random access occasions of the first subset of the plurality of random access occasions in a random access configuration period, a number of SSBs in the set of SSBs, or a set of allowable association periods.

12. The method of claim 10, wherein the performing the SSB-to-random access occasion mapping procedure further comprises:
determining a first association period based on at least one of a number of random access occasions of the first subset of the plurality of random access occasions in a random access configuration period, a number of SSBs in the set of SSBs, or a set of allowable association periods;
determining a second association period based on at least one of a number of random access occasions of the second subset of the plurality of random access occasions in the random access configuration period, the number of SSBs in the set of SSBs, or the set of allowable association periods; and
determining the common association period based on a maximum period between the first association period and the second association period.

13. The method of any of claim 6 or 7, further comprising:
performing a synchronization signal block (SSB)-to-random access occasion mapping procedure, wherein the performing the SSB-to-random access occasion mapping procedure comprises:
mapping a set of synchronization signal blocks (SSBs) to the first subset of the plurality of random access occasions based on a mapping order;
mapping the set of SSBs to the second subset of the plurality of random access occasions based on the mapping order;
determining a first association period based on at least one of a number of random access occasions of the first subset of the plurality of random access occasions in a random access configuration period, a number of SSBs in the set of SSBs, or a set of allowable association periods;
mapping the set of SSBs to the first subset of the plurality of random access occasions based on the first association period;
determining a second association period based on at least one of a number of random access occasions of the second subset of the plurality of random access occasions in the random access configuration period, the number of SSBs in the set of SSBs, or the set of allowable association periods; and
mapping the set of SSBs to the second subset of the plurality of random access occasions based on the second association period.

14. A wireless communication device, the comprising:
a transceiver configured to:
communicate, with a second wireless communication device, a random access configuration for a plurality of frame based equipment (FBE) frames, each FBE frame of the plurality of FBE frames including a transmission period and an idle period; and
a processor in communication with the transceiver, the processor configured to:
determine a plurality of random access occasions based on the random access configuration, wherein at least one random access occasion of the plurality of random access occasions is at least partially overlapping with the idle period of at least one of the plurality of FBE frames.

15. The wireless communication device of claim 14, wherein the processor is further configured to:
   determine a first group of random access occasions from the plurality of random access occasions, wherein each random access occasion in the first group is within the transmission period of one of the plurality of FBE frames; and
   determine a second group of random access occasions from the plurality of random access occasions, wherein each random access occasion in the second group is at least partially overlapping with the idle period of at least one of the plurality of FBE frames; and
   perform a synchronization signal block (SSB)-to-random access occasion mapping procedure, wherein the SSB-to-random access occasion mapping procedure comprises:
      mapping a set of synchronization signal blocks (SSBs) to the random access occasions in the first group based on a mapping order; and
      mapping the set of SSBs to the random access occasions in the second group based on the mapping order.

16. The wireless communication device of claim 15, wherein the processor is further configured to perform the SSB-to-random access occasion mapping procedure by:
   map the set of SSBs to the random access occasions in the first group based on a common association period;
   map the set of SSBs to the random access occasions in the second group based on the common association period; and
   determine the common association period based on at least one of a number of random access occasions of the first group in a random access configuration period, a number of SSBs in the set of SSBs, or a set of allowable association periods.

17. The wireless communication device of claim 15, wherein the processor is further configured to:
   map the set of SSBs to the random access occasions in the first group based on a common association period;
   map the set of SSBs to the random access occasions in the second group based on the common association period;
   determine a first association period based on at least one of a number of random access occasions of the first group in a random access configuration period, a number of SSBs in the set of SSBs, or a set of allowable association periods;
   determine a second association period based on at least one of a number of random access occasions of the second group in the random access configuration period, the number of SSBs in the set of SSBs, or the set of allowable association periods; and
   determine the common association period based on a maximum period between the first association period and the second association period.

18. The wireless communication device of claim 15, wherein the processor is further configured to:
   determine a first association period based on at least one of a number of random access occasions of the first group in a random access configuration period, a number of SSBs in the set of SSBs, or a set of allowable association periods;
   map the set of SSBs to the random access occasions in the first group based on the first association period;
   determine a second association period based on at least one of a number of random access occasions of the second group in the random access configuration period, the number of SSBs in the set of SSBs, or the set of allowable association periods; and
   map the set of SSBs to the random access occasions in the second group based on the second association period;
   mapping the set of SSBs to the random access occasions in the second group based on the second association period.

19. The wireless communication device of claim 14, wherein:
   the transceiver is further configured to communicate the random access configuration by:
      communicating, with the second wireless communication device, a first random access configuration indicating a first set of random access occasions in the plurality of FBE frames; and
      communicating, with the second wireless communication device, a second random access configuration indicating a second set of random access occasions in the plurality of FBE frames; and
   the processor is further configured to determine the plurality of random access occasions by:
      determining, based on the first random access configuration, a first subset of the plurality of random access occasions by excluding any random access occasion in the first set of random access occasions that is not fully within the transmission period of the plurality of FBE frames; and
      determining, based on the second random access configuration, a second subset of the plurality of random access occasions by excluding any random access occasion in the second set of random access occasions that is fully within the transmission period of the plurality of FBE frames.

20. The wireless communication device of claim 14, wherein:
   the transceiver is further configured to communicate the random access configuration by:
      communicating, with the second wireless communication device, a first random access configuration indicating a first set of random access occasions in the plurality of FBE frames; and
      communicating, with the second wireless communication device, a second random access configuration indicating a second set of random access occasions in the plurality of FBE frames, wherein each random access occasion of the second set of random access occasions is at least partially overlapping with the idle period of the plurality of FBE frames; and
   the processor is further configured to determine the plurality of random access occasions by:
      determining, based on the first random access configuration, a first subset of the plurality of random access occasions by excluding any random access occasion in the first set of random access occasions that is not fully within the transmission period of the plurality of FBE frames; and
      determining, based on the second random access configuration, a second subset of the plurality of random access occasions by including all of the second set of random access occasions.

21. The wireless communication device of claim 20, wherein the second random access configuration indicates at least one of a set of subframes for the second set of random access occasions, a random access slot within a random access subframe for the second set of random access occasions, a starting symbol for the second set of random access occasions, or a number of random access occasions in the random access slot,
 wherein the set of subframes include the idle period of a first FBE frame of the plurality of FBE frames,
 wherein the second random access configuration indicates the random access slot within the random access subframe, and wherein the random access slot is a last slot within the random access subframe, and
 wherein the second random access configuration indicates the starting symbol, and wherein the starting symbol is one of:
  within a first FBE frame of the plurality of FBE frames and outside of the idle period of the first FBE frame;
  within the idle period of a first FBE frame of the plurality of FBE frames; or
  within the idle period of a first FBE frame of the plurality of FBE frames and offset from an earliest symbol of the idle period of the first FBE frame.

22. The wireless communication device of claim 20, wherein the second random access configuration indicates at least one of a set of subframes for the second set of random access occasions, a random access slot within a random access subframe for the second set of random access occasions, a starting symbol for the second set of random access occasions, or a number of random access occasions in the random access slot,
 wherein the set of subframes include the idle period of a first FBE frame of the plurality of FBE frames,
 wherein the second random access configuration indicates the random access slot within the random access subframe, and wherein the random access slot is a last slot within the random access subframe,
 wherein the second random access configuration further indicates the number of random access occasions, and
 wherein a latest random access occasion of the second set of random access occasions is fully within the idle period of a first FBE frame of the plurality of FBE frames and offset from a last symbol of the idle period of the first FBE frame.

23. The wireless communication device of any of claim 19 or 20, wherein the processor is further configured to:
perform a synchronization signal block (SSB)-to-random access occasion mapping procedure, wherein the SSB-to-random access occasion mapping procedure comprises:
 mapping a set of synchronization signal blocks (SSBs) to the first subset of the plurality of random access occasions based on a mapping order;
 mapping the set of SSBs to the second subset of the plurality of random access occasions based on the mapping order;
 mapping the set of SSBs to the first subset of the plurality of random access occasions based on a common association period; and
 mapping the set of SSBs to the second subset of the plurality of random access occasions based on the common association period.

24. The wireless communication device of any of claim 19 or 20, wherein the processor is further configured to:
perform a synchronization signal block (SSB)-to-random access occasion mapping procedure, wherein the SSB-to-random access occasion mapping procedure comprises:
 mapping a set of synchronization signal blocks (SSBs) to the first subset of the plurality of random access occasions based on a mapping order;
 mapping the set of SSBs to the second subset of the plurality of random access occasions based on the mapping order; determining a first association period based on at least one of a number of random access occasions of the first subset of the plurality of random access occasions in a random access configuration period, a number of SSBs in the set of SSBs, or a set of allowable association periods;
 mapping the set of SSBs to the first subset of the plurality of random access occasions based on the first association period;
 determining a second association period based on at least one of a number of random access occasions of the second subset of the plurality of random access occasions in the random access configuration period, the number of SSBs in the set of SSBs, or the set of allowable association periods; and
 mapping the set of SSBs to the second subset of the plurality of random access occasions based on the second association period.

25. A wireless communication device, comprising:
means for communicating, with a second wireless communication device, a random access configuration for a plurality of frame based equipment (FBE) frames, each FBE frame of the plurality of FBE frames including a transmission period and an idle period; and
means for determining a plurality of random access occasions based on the random access configuration, wherein at least one random access occasion of the plurality of random access occasions is at least partially overlapping with the idle period of at least one of the plurality of FBE frames.

26. The wireless communication device of claim 25, wherein the means for determining comprises:
means for determining a first group of random access occasions from the plurality of random access occasions, wherein each random access occasion in the first group is within the transmission period of one of the plurality of FBE frames; and
means for determining a second group of random access occasions from the plurality of random access occasions, wherein each random access occasion in the second group is at least partially overlapping with the idle period of at least one of the plurality of FBE frames; and
wherein the wireless communication device further comprises:
means for performing a synchronization signal block (SSB)-to-random access occasion mapping procedure, wherein the SSB-to-random access occasion mapping procedure comprises:
 mapping a set of synchronization signal blocks (SSBs) to the random access occasions in the first group based on a mapping order; and
 mapping the set of SSBs to the random access occasions in the second group based on the mapping order.

27. The wireless communication device of claim 26, further comprising:
means for mapping the set of SSBs to the random access occasions in the first group based on a common association period;

means for mapping the set of SSBs to the random access occasions in the second group based on the common association period; and means for determining the common association period based on at least one of a number of random access occasions of the first group in a random access configuration period, a number of SSBs in the set of SSBs, or a set of allowable association periods.

28. The wireless communication device of claim 26, further comprising:
    means for mapping the set of SSBs to the random access occasions in the first group based on a common association period;
    means for mapping the set of SSBs to the random access occasions in the second group based on the common association period;
    means for determining a first association period based on at least one of a number of random access occasions of the first group in a random access configuration period, a number of SSBs in the set of SSBs, or a set of allowable association periods;
    means for determining a second association period based on at least one of a number of random access occasions of the second group in the random access configuration period, the number of SSBs in the set of SSBs, or the set of allowable association periods; and
    means for determining the common association period based on a maximum period between the first association period and the second association period.

29. The wireless communication device of claim 26, further comprising:
    means for determining a first association period based on at least one of a number of random access occasions of the first group in a random access configuration period, a number of SSBs in the set of SSBs, or a set of allowable association periods;
    means for mapping the set of SSBs to the random access occasions in the first group based on the first association period;
    means for determining a second association period based on at least one of a number of random access occasions of the second group in the random access configuration period, the number of SSBs in the set of SSBs, or the set of allowable association periods; and
    means for mapping the set of SSBs to the random access occasions in the second group based on the second association period.

30. The wireless communication device of claim 25, wherein:
    the means for communicating the random access configuration comprises:
        means for communicating, with the second wireless communication device, a first random access configuration indicating a first set of random access occasions in the plurality of FBE frames; and
        means for communicating, with the second wireless communication device, a second random access configuration indicating a second set of random access occasions in the plurality of FBE frames; and
    the means for determining comprises:
        means for determining, based on the first random access configuration, a first subset of the plurality of random access occasions by excluding any random access occasion in the first set of random access occasions that is not fully within the transmission period of the plurality of FBE frames; and
        means for determining, based on the second random access configuration, a second subset of the plurality of random access occasions by excluding any random access occasion in the second set of random access occasions that is fully within the transmission period of the plurality of FBE frames.

31. The wireless communication device of claim 25, wherein:
    the means for communicating the random access configuration comprises:
        means for communicating, with the second wireless communication device, a first random access configuration indicating a first set of random access occasions in the plurality of FBE frames; and
        means for communicating, with the second wireless communication device, a second random access configuration indicating a second set of random access occasions in the plurality of FBE frames, wherein each random access occasion of the second set of random access occasions is at least partially overlapping with the idle period of the plurality of FBE frames; and
    the means for determining the plurality of random access occasions comprises:
        means for determining, based on the first random access configuration, a first subset of the plurality of random access occasions by excluding any random access occasion in the first set of random access occasions that is not fully within the transmission period of the plurality of FBE frames; and
        means for determining, based on the second random access configuration, a second subset of the plurality of random access occasions by including all of the second set of random access occasions.

32. The wireless communication device of claim 31, wherein the second random access configuration indicates at least one of a set of subframes for the second set of random access occasions, a random access slot within a random access subframe for the second set of random access occasions, a starting symbol for the second set of random access occasions, or a number of random access occasions in the random access slot,
    wherein the set of subframes include the idle period of a first FBE frame of the plurality of FBE frames,
    wherein the second random access configuration indicates the random access slot within the random access subframe, and wherein the random access slot is a last slot within the random access subframe, and
    wherein the second random access configuration indicates the starting symbol, and wherein the starting symbol is one of:
        within a first FBE frame of the plurality of FBE frames and outside of the idle period of the first FBE frame;
        within the idle period of a first FBE frame of the plurality of FBE frames; or
        within the idle period of a first FBE frame of the plurality of FBE frames and offset from an earliest symbol of the idle period of the first FBE frame.

33. The wireless communication device of claim 31, wherein the second random access configuration indicates at least one of a set of subframes for the second set of random access occasions, a random access slot within a random access subframe for the second set of random access occasions, a starting symbol for the second set of random access occasions, or a number of random access occasions in the random access slot, wherein the set of subframes include the idle period of a first FBE frame of the plurality of FBE frames, wherein the second random access configuration indicates the random access slot within the random access subframe, and wherein the random access slot is a last slot within the random access subframe, wherein the second random access configuration further indicates the number of random access occasions, and wherein a latest random access occasion of the second set of random access occasions is fully within the idle period of a first FBE frame of the plurality of FBE frames and offset from a last symbol of the idle period of the first FBE frame.

34. The wireless communication device of any of claim 30 or 31, further comprising:
   means for performing a synchronization signal block (SSB)-to-random access occasion mapping procedure, wherein the SSB-to-random access occasion mapping procedure comprises:
      mapping a set of synchronization signal blocks (SSBs) to the first subset of the plurality of random access occasions based on a mapping order;
      mapping the set of SSBs to the second subset of the plurality of random access occasions based on the mapping order;
      mapping the set of SSBs to the first subset of the plurality of random access occasions based on a common association period; and
      mapping the set of SSBs to the second subset of the plurality of random access occasions based on the common association period.

35. A non-transitory computer-readable medium having program code recorded thereon for wireless communication by a wireless communication device, the program code comprising:
   code for causing the wireless communication device to communicate, with a second wireless communication device, a random access configuration for a plurality of frame based equipment (FBE) frames, each FBE frame of the plurality of FBE frames including a transmission period and an idle period; and
   code for causing the wireless communication device to determine a plurality of random access occasions based on the random access configuration, wherein at least one random access occasion of the plurality of random access occasions is at least partially overlapping with the idle period of at least one of the plurality of FBE frames.

* * * * *